(12) United States Patent
Kim

(10) Patent No.: US 10,281,752 B2
(45) Date of Patent: May 7, 2019

(54) DISPLAY DEVICE

(71) Applicant: Samsung Display Co., Ltd., Yongin-si (KR)

(72) Inventor: Seulki Kim, Asan-si (KR)

(73) Assignee: Samsung Display Co., Ltd., Yongin-si (KR)

(*) Notice: Subject to any disclaimer, the term of this patent is extended or adjusted under 35 U.S.C. 154(b) by 1 day.

(21) Appl. No.: 15/682,007

(22) Filed: Aug. 21, 2017

(65) Prior Publication Data

US 2018/0059449 A1 Mar. 1, 2018

(30) Foreign Application Priority Data

Aug. 23, 2016 (KR) .................. 10-2016-0107160

(51) Int. Cl.
*G02F 1/1343* (2006.01)
*G02F 1/13* (2006.01)
*G02F 1/1362* (2006.01)

(52) U.S. Cl.
CPC ...... *G02F 1/1309* (2013.01); *G02F 1/136286* (2013.01); *G02F 1/136259* (2013.01); *G02F 2001/13629* (2013.01); *G02F 2001/136263* (2013.01)

(58) Field of Classification Search
None
See application file for complete search history.

(56) References Cited

U.S. PATENT DOCUMENTS

2007/0040794 A1 2/2007 Kwak et al.
2008/0158127 A1* 7/2008 Chang .............. G02F 1/136259
345/93
2017/0010497 A1 1/2017 Kim et al.

FOREIGN PATENT DOCUMENTS

| KR | 10-2007-0020778 | 2/2007 |
| KR | 10-2007-0047950 | 5/2007 |
| KR | 10-2008-0044073 | 5/2008 |

* cited by examiner

*Primary Examiner* — Richard H Kim
(74) *Attorney, Agent, or Firm* — H.C. Park & Associates, PLC

(57) ABSTRACT

A display device includes a first substrate, a second substrate, a gate line, a data line, a link line, a driving integrated circuit, a repair line, and a dummy line. The second substrate is spaced apart from the first substrate. The gate line is on the first substrate. The data line is on the first substrate. The link line is connected to one of the gate line and the data line. The driving integrated circuit is connected to the link line. The repair line is in a non-display area of the first substrate. The repair line overlaps, in the non-display area, the link line and the one of the gate line and the data line. The dummy line overlaps the repair line. Shapes of the dummy line and the repair line are substantially equivalent.

20 Claims, 19 Drawing Sheets

DISPLAY DEVICE

CROSS-REFERENCE TO RELATED APPLICATION

This application claims priority from and the benefit of Korean Patent Application No. 10-2016-0107160, filed Aug. 23, 2016, which is hereby incorporated by reference for all purposes as if fully set forth herein.

BACKGROUND

Field

Exemplary embodiments relate to a display device. More particularly, exemplary embodiments relate to a display device including a repair line capable of repairing disconnection of a signal line.

Discussion

Liquid crystal display ("LCD") devices are a widely used type of flat panel display ("FPD") device. An LCD device typically includes two substrates on which electrodes are formed and a liquid crystal layer interposed between the two substrates. Upon applying voltage to the electrodes, liquid crystal molecules of the liquid crystal layer can be arranged such that an amount of light transmitted through the liquid crystal layer can be controlled. Such an LCD device also typically includes a plurality of data lines and a plurality of gate (or scan) lines, and among these signal lines, a relatively long data line may be disconnected as a result of at least one manufacturing process.

The above information disclosed in this section is only for enhancement of an understanding of the background of the inventive concepts, and, therefore, it may contain information that does not form prior art already known to a person of ordinary skill in the art.

SUMMARY

Exemplary embodiments provide a display device that enables repair of disconnection of a signal line.

Additional aspects will be set forth in the detailed description which follows, and, in part, will be apparent from the disclosure, or may be learned by practice of the inventive concepts.

According to some exemplary embodiments, a display device includes a first substrate, a second substrate, a gate line, a data line, a link line, a driving integrated circuit, a repair line, and a dummy line. The second substrate is spaced apart from the first substrate. The gate line is on the first substrate. The data line is on the first substrate. The link line is connected to one of the gate line and the data line. The driving integrated circuit is connected to the link line. The repair line is in a non-display area of the first substrate. The repair line overlaps, in the non-display area, the link line and the one of the gate line and the data line. The dummy line overlaps the repair line. Shapes of the dummy line and the repair line are substantially equivalent.

According to some exemplary embodiments, a display device includes a first substrate, a second substrate, a gate line, a data line, a link line, a driving integrated circuit, and a repair line. The second substrate is spaced apart from the first substrate. The gate line is on the first substrate. The data line is on the first substrate. The link line is connected to one of the gate line and the data line. The driving integrated circuit is connected to the link line. The repair line is in a non-display area of the first substrate. The repair line overlaps, in the non-display area, the link line and the one of the gate line and the data line. A portion of the repair line is disposed between the driving integrated circuit and the link line.

According to some exemplary embodiments, a display device includes a substrate; a signal line on the substrate; a repair line in a non-display area of the substrate overlapping the signal line; and a dummy metal line overlapping the repair line, the dummy metal line shaped along the repair line without electrically contact.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concepts, and are incorporated in and constitute a part of this specification, illustrate exemplary embodiments of the inventive concepts, and, together with the description, serve to explain principles of the inventive concepts.

DETAILED DESCRIPTION OF THE ILLUSTRATED EMBODIMENTS

Figure 1:
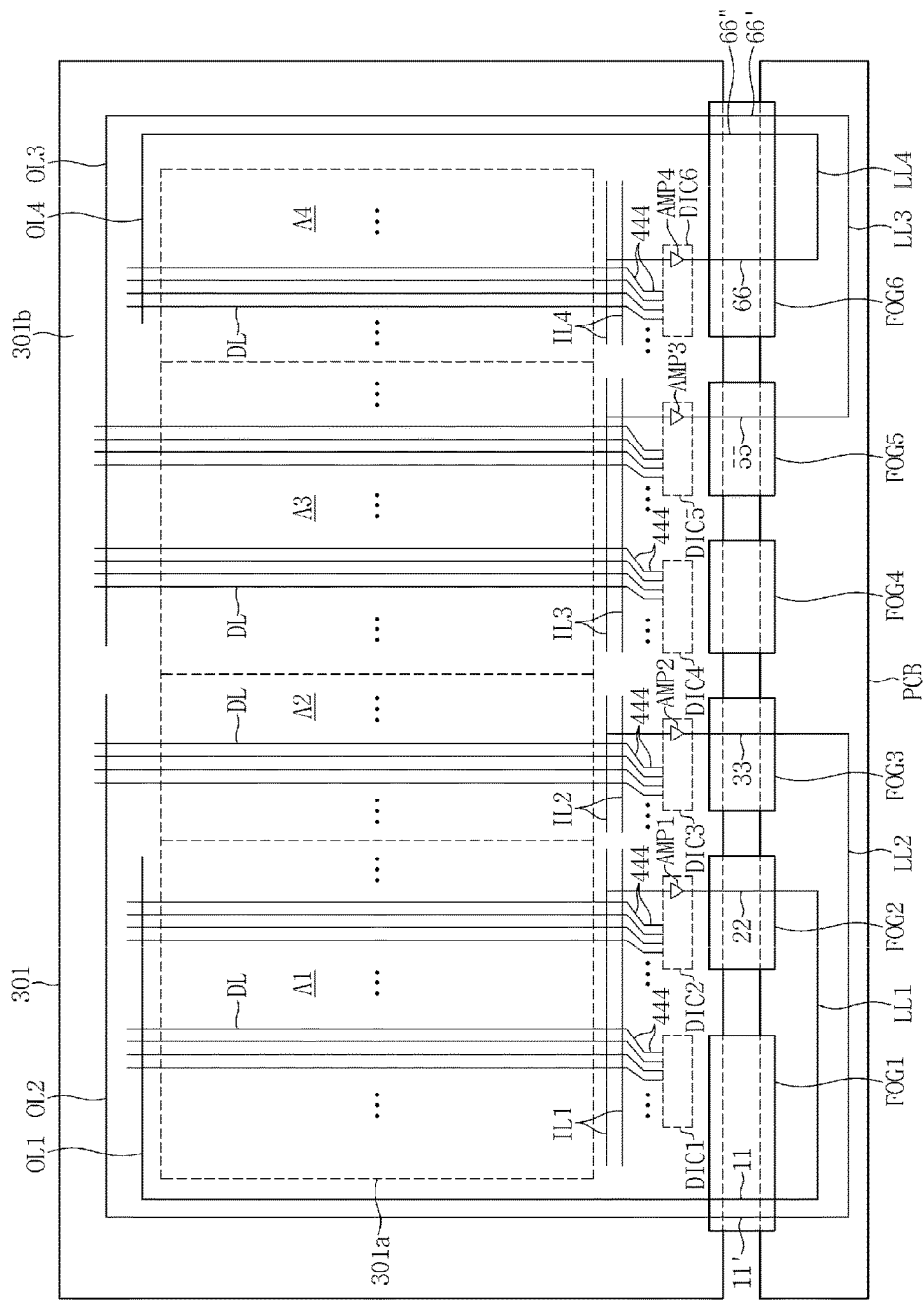
FIG. 1 is a view illustrating a display device according to some exemplary embodiments.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

Unless otherwise specified, the illustrated exemplary embodiments are to be understood as providing exemplary features of varying detail of various exemplary embodiments. Therefore, unless otherwise specified, the features, components, modules, layers, films, panels, regions, aspects, etc. (hereinafter collectively referred to as "elements"), of the various illustrations may be otherwise combined, separated, interchanged, and/or rearranged without departing from the disclosed exemplary embodiments.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying figures, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element is referred to as being "on," "connected to," or "coupled to" another element, it may be directly on, connected to, or coupled to the other element or intervening elements may be present. When, however, an element is referred to as being "directly on," "directly connected to," or "directly coupled to" another element, there are no intervening elements present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various elements, these elements should not be limited by these terms. These terms are used to distinguish one element from another element. Thus, a first element discussed below could be termed a second element without departing from the teachings of the present disclosure.

Spatially relative terms, such as "beneath," "below," "under," "lower," "above," "upper," "over," and the like, may be used herein for descriptive purposes, and, thereby, to describe one element's relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," "approximately," and other similar terms, are used as terms of approximation and not as terms of degree, and, as such, are utilized to account for inherent deviations in measured, calculated, and/or provided values that would be recognized by one of ordinary skill in the art. To this end, "about," "substantially," "approximately," and other similar terms, are used herein are inclusive of a stated value and includes a value within an acceptable range of deviation for the state value as determined by one of ordinary skill in the art, considering the measurement in question and error associated with measurement of the particular quantity (e.g., limitations of the measurement system). For example, "about" can mean within one or more standard deviations, or within ±30%, 20%, 10%, or 5% of the stated value.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. In this manner, regions illustrated in the drawings are schematic in nature and shapes of these regions may not illustrate the actual shapes of regions of a device, and, as such, are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

FIG. 1 is a view illustrating a display device according to some exemplary embodiments.

According to an exemplary embodiment, as illustrated in FIG. 1, a display device includes a first substrate 301, a plurality of data driving integrated circuits ("ICs") DIC1, DIC2, DIC3, DIC4, DIC5, and DIC6, a plurality of connection portions FOG1, FOG2, FOG3, FOG4, FOG5, and FOG6, a plurality of input repair lines IL1, IL2, IL3, and IL4, a plurality of output repair lines OL1, OL2, OL3, and OL4, a plurality of via lines LL1, LL2, LL3, and LL4, a plurality of data lines DL, a plurality of amplifiers AMP1, AMP2, AMP3, and AMP4, and a printed circuit board ("PCB").

The first substrate 301 includes a display area 301a and a non-display area 301b. A plurality of pixels (not illustrated) are arranged in the display area 301a.

Figure 2:
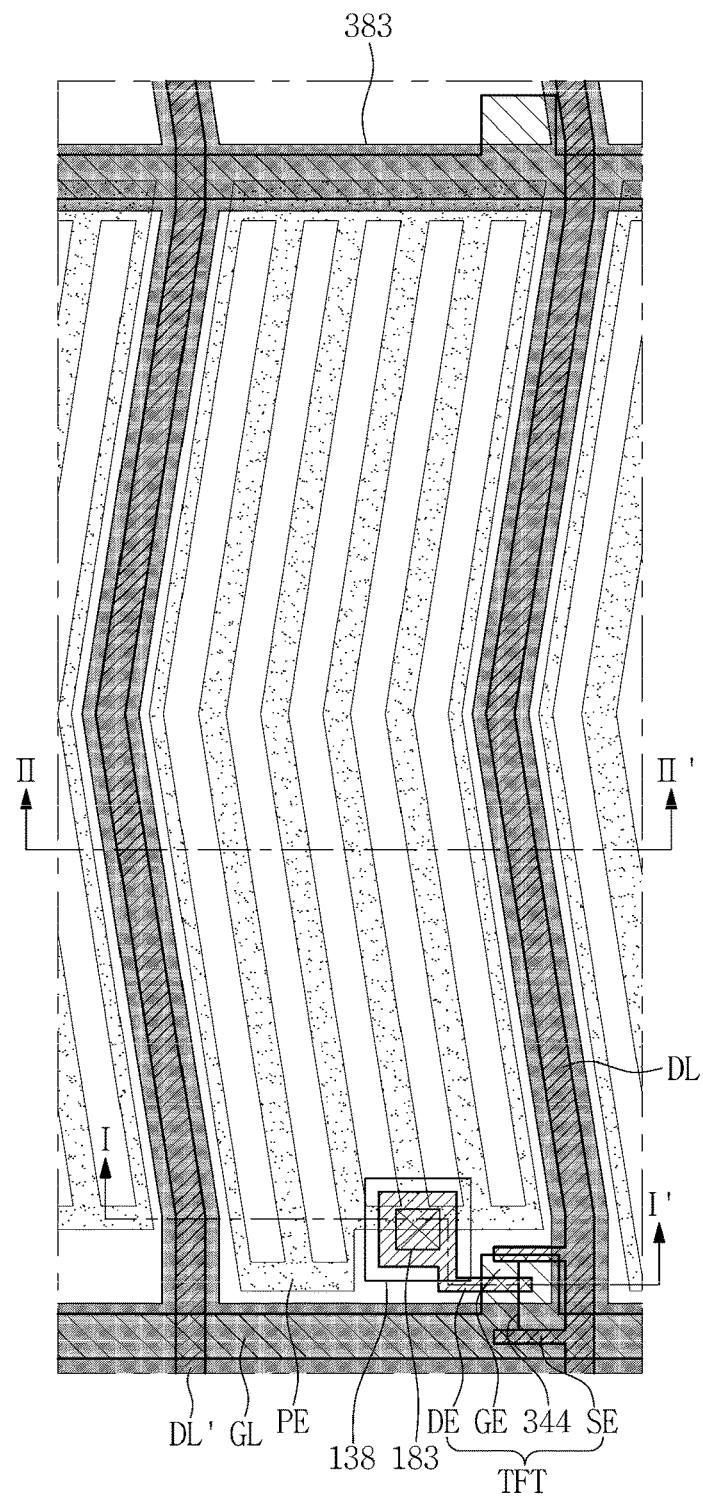
FIG. 2 is a plan view illustrating a portion of a display area of the display device of FIG. 1 according to some exemplary embodiments.
Figure 3:
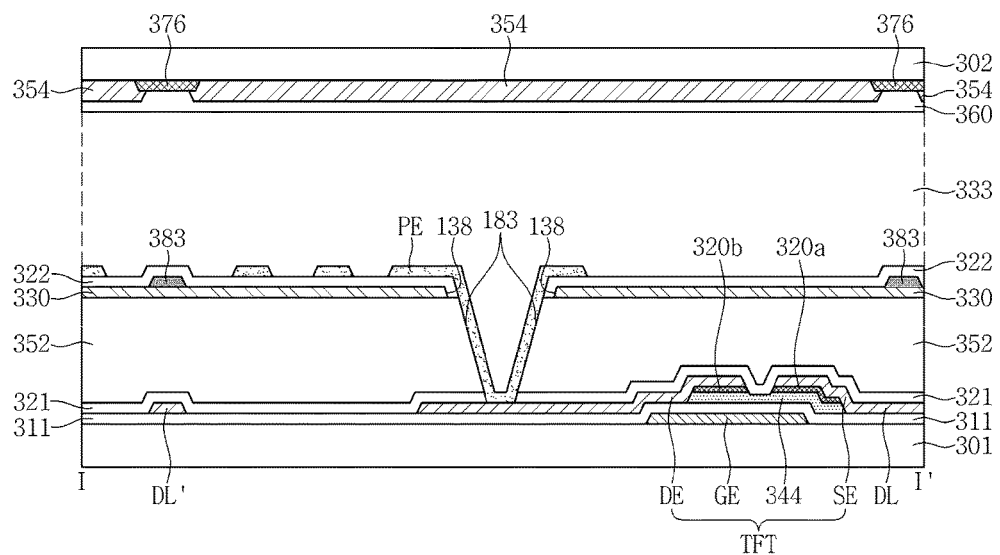
FIG. 3 is a cross-sectional view of the display device of FIG. 1 taken along sectional line I-I' of FIG. 2 according to some exemplary embodiments.
Figure 4:
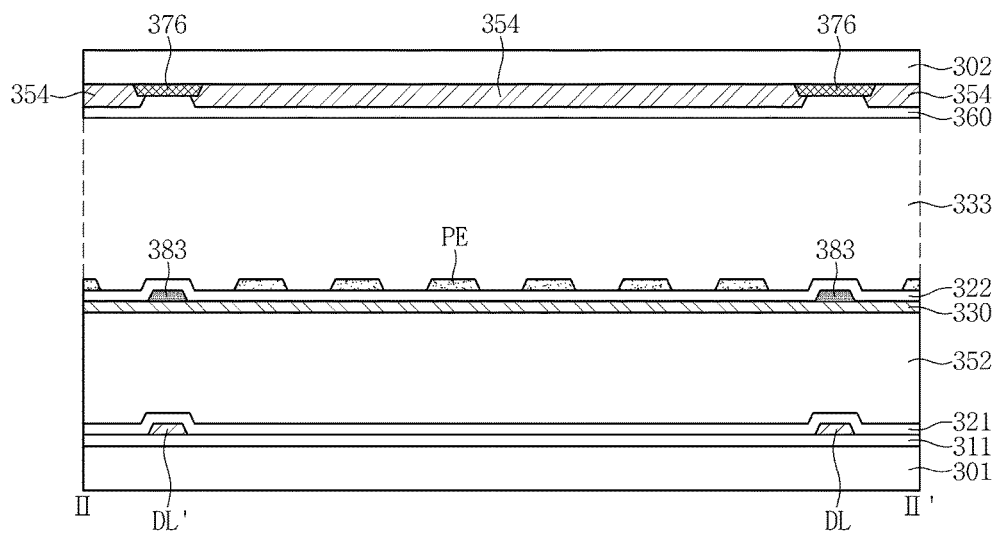
FIG. 4 is a cross-sectional view of the display device of FIG. 1 taken along sectional line II-II' of FIG. 2 according to some exemplary embodiments.

FIG. 2 is a plan view illustrating a portion of a display area of the display device of FIG. 1 according to some exemplary embodiments. FIG. 3 is a cross-sectional view of the display device of FIG. 1 taken along sectional line I-I' of FIG. 2 according to some exemplary embodiments. FIG. 4 is a cross-sectional view of the display device of FIG. 1 taken along sectional line II-II' of FIG. 2 according to some exemplary embodiments.

The display device, as illustrated in FIGS. 2 and 3, includes the first substrate 301, a gate line GL, a gate electrode GE, a gate insulating layer 311, a data line DL, a source electrode SE, a drain electrode DE, a common line 383, a first protective layer 321, an insulating interlayer 352, a pixel electrode PE, a second protective layer 322, a common electrode 330, a second substrate 302, a light shielding layer 376, a color filter 354, an overcoat layer 360, and a liquid crystal layer 333.

The gate line GL and the gate electrode GE are disposed on the first substrate 301. The gate electrode GE may have a shape protruding from the gate line GL toward the pixel electrode PE. The gate line GL and the gate electrode GE may be unitary.

At least one of the gate line GL and the gate electrode GE may include or be formed of aluminum (Al) or alloys thereof, silver (Ag) or alloys thereof, copper (Cu) or alloys thereof, and/or molybdenum (Mo) or alloys thereof. In an alternative exemplary embodiment, at least one of the gate line GL and the gate electrode GE may include or be formed of one of chromium (Cr), tantalum (Ta), and titanium (Ti). In an alternative exemplary embodiment, at least one of the gate line GL and the gate electrode GE may have a multilayer structure including at least two conductive layers that have different physical properties from one another.

The gate insulating layer 311 is disposed on the gate line GL and the gate electrode GE. In such an exemplary embodiment, the gate insulating layer 311 is disposed over an entire surface of the first substrate 301 including the gate line GL and the gate electrode GE.

The gate insulating layer 311 may include or be formed of silicon nitride (SiNx) or silicon oxide (SiOx). The gate insulating layer 311 may have a multilayer structure including at least two insulating layers having different physical properties from one another.

The data line DL and a semiconductor layer 344 are disposed on the gate insulating layer 311. Although not illustrated, an end portion of the data line DL may be connected to another layer or a driving circuit, such as an external driving circuit. The end portion of the data line DL may have a larger area than an area of another portion of the data line DL.

In order to ensure a maximum (or at least an increased) transmittance of the display device, as illustrated in FIG. 2, a middle portion of the data line DL may have a bent shape, e.g., a V-like shape. In addition, a middle portion of the pixel electrode PE may have a bent shape, e.g., a V-like shape.

The data line DL may include or be formed of a refractory metal, such as molybdenum, chromium, tantalum, and titanium, or an alloy thereof. The data line DL may have a multilayer structure including a refractory metal layer and a low-resistance conductive layer. Examples of the multilayer structure may include: a double-layer structure including a chromium or molybdenum (or alloys thereof) lower layer and an aluminum (or alloy thereof) upper layer; and a triple-layer structure including a molybdenum (or alloy thereof) lower layer, an aluminum (or alloy thereof) intermediate layer, and a molybdenum (or alloy thereof) upper layer. In an alternative exemplary embodiment, the data line DL may include or be formed of any suitable metal(s) or conductor(s) rather than the aforementioned materials.

The semiconductor layer 344 overlaps the gate electrode GE, the source electrode SE, and the drain electrode DE. The semiconductor layer 344 may include amorphous silicon, polycrystalline silicon, or the like.

The source electrode SE is disposed on the semiconductor layer 344 and the gate insulating layer 311. The source electrode SE overlaps the semiconductor layer 344 and the gate electrode GE. The source electrode SE may have a shape protruding from the data line DL. The source electrode SE and the data line DL may be unitary. The source electrode SE may be a portion of the data line DL. The source electrode SE may include substantially a same material and have substantially a same structure (e.g., a multilayer structure) as those of the data line DL described above. The source electrode SE and the data line DL may be simultaneously formed in substantially a same process.

The drain electrode DE is disposed on the semiconductor layer 344 and the gate insulating layer 311, and is spaced apart from the source electrode SE at a determined distance. The drain electrode DE overlaps the semiconductor layer 344 and the gate electrode GE. A channel area of a switching element TFT is positioned between the drain electrode DE and the source electrode SE in a view normal to a surface of the first substrate 301. The drain electrode DE may include substantially a same material and have substantially a same structure (e.g., a multilayer structure) as those of the source electrode SE. The drain electrode DE and the source electrode SE may be simultaneously formed in substantially a same process.

The switching element TFT may further include a first ohmic contact layer 320a and a second ohmic contact layer 320b.

The first ohmic contact layer 320a is disposed between the semiconductor layer 344 and the source electrode SE. The first ohmic contact layer 320a reduces an interfacial resistance between the semiconductor layer 344 and the source electrode SE. The first ohmic contact layer 320a may include silicide or n+hydrogenated amorphous silicon doped with n-type impurity ions, e.g., phosphorus (P) or phosphine (PH$_3$), at high concentration. It is contemplated, however, that any other suitable material may be utilized.

The second ohmic contact layer 320b is disposed between the semiconductor layer 344 and the drain electrode DE. The second ohmic contact layer 320b reduces an interfacial resistance between the semiconductor layer 344 and the drain electrode DE. The second ohmic contact layer 320b may include substantially a same material and have substantially a same structure (e.g., a multilayer structure) as those of the first ohmic contact layer 320a. The first ohmic contact layer 320a and the second ohmic contact layer 320b may be simultaneously formed in substantially a same process.

Although not illustrated, the semiconductor layer 344 may further be disposed between the gate insulating layer 311 and the source electrode SE. In addition, the semiconductor layer 344 may further be disposed between the gate insulating layer 311 and the drain electrode DE. Herein, a portion of the semiconductor layer 344 between the gate insulating layer 311 and the source electrode SE is to be defined as a first additional semiconductor layer, and a portion of the semiconductor layer 344 between the gate insulating layer 311 and the drain electrode DE is to be defined as a second additional semiconductor layer. In such an exemplary embodiment, the aforementioned first ohmic contact layer 320a may further be disposed between the first additional semiconductor layer and the source electrode SE, and the aforementioned second ohmic contact layer 320b may further be disposed between the second additional semiconductor layer and the drain electrode DE.

In addition, although not illustrated, the semiconductor layer 344 may further be disposed between the gate insulating layer 311 and the data line DL. Herein, a portion of the semiconductor layer 344 between the gate insulating layer 311 and the data line DL is to be defined as a third additional semiconductor layer. In such an exemplary embodiment, the aforementioned first ohmic contact layer 320a may further be disposed between the third additional semiconductor layer and the data line DL.

The first protective layer 321 is disposed on the data line DL, the source electrode SE, and the drain electrode DE. In such an exemplary embodiment, the first protective layer 321 is disposed over an entire surface of the first substrate 301 including the data line DL, the source electrode SE, and the drain electrode DE.

The first protective layer 321 may include an inorganic insulating material, such as silicon nitride (SiN$_x$) or silicon oxide (SiO$_x$), and in such an exemplary embodiment, an inorganic insulating material having photosensitivity and having a dielectric constant of about 4.0 may be used. In an exemplary embodiment, the first protective layer 321 may have a double-layer structure including a lower inorganic layer and an upper organic layer. The first protective layer 321 may have a thickness greater than or equal to about 5000 Å, e.g., in a range of about 6000 Å to about 8000 Å.

The insulating interlayer 352 is disposed on the first protective layer 321. The insulating interlayer 352 may include an organic layer having a relatively low dielectric constant. For example, the insulating interlayer 352 may include a photosensitive organic layer having a lower dielectric constant than that of the first protective layer 321.

The common electrode 330 is disposed on the insulating interlayer 352. The common electrode 330 may have a hole 138 defined corresponding to a drain contact hole 183. The common electrode 330 may include a transparent metal layer including, for example, indium zinc oxide (IZO) or indium tin oxide (ITO); however, exemplary embodiments are not limited thereto or thereby.

The common line 383 is disposed on the common electrode 330. For example, the common line 383 is disposed directly on the common electrode 330. The common line 383 is connected to the common electrode 330. The common line 383 directly contacts the common electrode 330. In addition, the common line 383 overlaps the gate line GL, the data line DL, the switching element TFT, and the pixel electrode PE. In an alternative exemplary embodiment, the common line 383 may not overlap the data line DL. For example, a portion of the common line 383 on the data line DL may be omitted.

A portion of the common line 383 on the data line DL may have a width greater than or equal to a width of the data line DL, and, in such an exemplary embodiment, may prevent (or at least reduce) light leakage between two pixels that are adjacent to each other with respect to the data line DL. Accordingly, the light shielding layer 376 between the two pixels that are adjacent to each other with respect to the data line DL may be omitted.

The common line 383, dissimilar to the common electrode 330, may include a metal that is opaque and has relatively high conductivity. For example, the common line 383 may include substantially a same material as that included in the gate line GL or the data line DL described above. In addition, the common line 383 may include an organic material having relatively high electric conductivity. The common line 383 and the common electrode 330 receive a common voltage from, for instance, an external source.

The second protective layer 322 is disposed on the common line 383, the common electrode 330, and the insulating interlayer 352. The second protective layer 322 may include substantially a same material as that included in the first protective layer 321 described above.

The pixel electrode PE is disposed on the second protective layer 322. The pixel electrode PE is connected to the drain electrode DE. For example, the pixel electrode PE is connected to the drain electrode DE through the drain contact hole 183 which passes through the first protective layer 321, the insulating interlayer 352, and the second protective layer 322. The pixel electrode PE may include a transparent metal layer including, for example, IZO or ITO described above; however, exemplary embodiments are not limited thereto or thereby. In an exemplary embodiment, when the pixel electrode PE includes IZO, the common electrode 330 may include ITO.

The light shielding layer 376 is disposed on the second substrate 302. The light shielding layer 376 is disposed corresponding to the gate line GL, the data line DL, and the switching element TFT. The light shielding layer 376 has an opening portion defining a pixel area.

The color filter 354 is disposed on the second substrate 302. In such an exemplary embodiment, the color filter 354 is disposed in a portion of the opening portion of the light shielding layer 376 corresponding to the pixel area. In addition, an edge portion of the color filter 354 is disposed on the light shielding layer 376.

The overcoat layer 360 is disposed on the light shielding layer 376 and the color filter 354. The overcoat layer 360 may be disposed over an entire surface of the second substrate 302 including the light shielding layer 376. The overcoat layer 360 serves to significantly reduce (e.g., minimize) a height difference among components between the overcoat layer 360 and the second substrate 302, that is, components of the second substrate 302, such as the light shielding layer 376 and the color filter 354. The overcoat layer 360 may be omitted.

The liquid crystal layer 333 is disposed between the first substrate 301 and the second substrate 302. The liquid crystal layer 333 may include liquid crystal molecules having negative dielectric anisotropy and aligned vertically. Alternatively, the liquid crystal layer 333 may include a photopolymerizable material, and such a photopolymerizable material may be a reactive monomer or a reactive mesogen. Exemplary embodiments, however, are not limited thereto or thereby.

In an exemplary embodiment, as illustrated in FIG. 1, the display area 301a may be divided into a plurality of divided display areas A1, A2, A3, and A4. For example, as illustrated in FIG. 1, the display area 301a may be divided into first, second, third, and fourth divided display areas A1, A2, A3, and A4. Respective planar areas of the divided display areas A1, A2, A3, and A4 may be substantially the same as one another, or may be different from one another as illustrated in FIG. 1.

The plurality of data lines DL are disposed on the first substrate 301. The plurality of data lines DL are disposed in the display area 301a. Some of the plurality of data lines DL are disposed in the first divided display area A1, a few other data lines are disposed in the second divided display area A2, another few other data lines are disposed in the third divided display area A3, and another few other data lines are disposed in the fourth divided display area A4.

The data driving ICs DIC1, DIC2, DIC3, DIC4, DIC5, and DIC6 provide image data signals to the data lines DL. To this end, the data driving ICs DIC1, DIC2, DIC3, DIC4, DIC5, and DIC6 are connected to the data lines DL. For example, the first data driving IC DIC1 and the second data driving IC DIC2 are connected to data lines in the first divided display area A1, the third data driving IC DIC3 is connected to data lines in the second divided display area A2, the fourth data driving IC DIC4 and the fifth data driving IC DIC5 are connected to data lines in the third divided display area A3, and the sixth data driving IC DIC6 is connected to data lines in the fourth divided display area A4.

Each of the data driving ICs DIC1, DIC2, DIC3, DIC4, DIC5, and DIC6 is connected to the data lines DL through respective link lines 444 (also referred to as a fan-out line). For example, the first data driving IC DIC1 is connected to the data line DL through the link line 444.

The first, second, third, fourth, fifth, and sixth connection portions FOG1, FOG2, FOG3, FOG4, FOG5, and FOG6 electrically connect the PCB and the first substrate 301 to each other. The first connection portion FOG1 is connected between the PCB and a portion of the non-display area 301b of the first substrate 301 adjacent to the first data driving IC DIC1, the second connection portion FOG2 is connected between the PCB and a portion of the non-display area 301b of the first substrate 301 adjacent to the second data driving IC DIC2, the third connection portion FOG3 is connected between the PCB and a portion of the non-display area 301b of the first substrate 301 adjacent to the third data driving IC DIC3, the fourth connection portion FOG4 is connected between the PCB and a portion of the non-display area 301b of the first substrate 301 adjacent to the fourth data driving IC DIC4, the fifth connection portion FOG5 is connected between the PCB and a portion of the non-display area 301b of the first substrate 301 adjacent to the fifth data driving IC DIC5, and the sixth connection portion FOG6 is connected between the PCB and a portion of the non-display area 301b of the first substrate 301 adjacent to the sixth data driving IC DIC6. Each of the connection portions FOG1, FOG2, FOG3, FOG4, FOG5, and FOG6 may be a flexible printed circuit board (FPCB).

According to an exemplary embodiment, the display device may include one connection portion in lieu of the plurality of connection portions. In such an exemplary embodiment, each of the data driving ICs DIC1, DIC2, DIC3, DIC4, DIC5, and DIC6 is commonly connected to the one connection portion.

When one side of the sides of the first substrate 301 overlapping the connection portions FOG1, FOG2, FOG3, FOG4, FOG5, and FOG6 is defined as a first side and one side of the sides of the display area 301a facing the first side is defined as a second side, the input repair lines IL1, IL2, IL3, and IL4 may be disposed in the non-display area 301b between the first side and the second side.

The second side includes one side of the first divided display area A1, one side of the second divided display area A2, one side of the third divided display area A3, and one side of the fourth divided display area A4. For example, when one side of the sides of the first divided display area A1 facing the first side is defined as a first divided side, one side of the sides of the second divided display area A2 facing the first side is defined as a second divided side, one side of the sides of the third divided display area A3 facing the first side is defined as a third divided side, and one side of the sides of the fourth divided display area A4 facing the first side is defined as a fourth divided side. The second side includes the first, second, third, and fourth divided sides.

The first input repair line IL1 is disposed between the first side and the first divided side, the second input repair line IL2 is disposed between the first side and the second divided side, the third input repair line IL3 is disposed between the first side and the third divided side, and the fourth input repair line IL4 is disposed between the first side and the fourth divided side. The input repair lines IL1, IL2, IL3, and IL4 intersect the link lines 444 in the non-display area 301b between the first side and the second side.

Each link line 444 connected to the data lines DL in the first divided display area A1 is defined as a first link line, each link line 444 connected to the data lines DL in the second divided display area A2 is defined as a second link line, each link line 444 connected to the data lines DL in the third divided display area A3 is defined as a third link line, and each link line 444 connected to the data lines DL in the fourth divided display area A4 is defined as a fourth link line.

The first input repair line IL1 intersects the first link lines, the second input repair line IL2 intersects the second link lines, the third input repair line IL3 intersects the third link lines, and the fourth input repair line IL4 intersects the fourth link lines. The input repair lines IL1, IL2, IL3, and IL4 are electrically separated from one another.

The amplifiers AMP1, AMP2, AMP3, and AMP4 may be embedded in a corresponding data driving IC. For example, the first amplifier AMP1 may be embedded in the second data driving IC DIC2, the second amplifier AMP2 may be embedded in the third data driving IC DIC3, the third amplifier AMP3 may be embedded in the fifth data driving IC DIC5, and the fourth amplifier AMP4 may be embedded in the sixth data driving IC DIC6. Although not illustrated, each of the amplifiers AMP1, AMP2, AMP3, and AMP4 includes an input terminal and an output terminal.

The input terminal of the first amplifier AMP1 is connected to the first input repair line IL1 the input terminal of the second amplifier AMP2 is connected to the second input repair line IL2, the input terminal of the third amplifier AMP3 is connected to the third input repair line IL3, and the input terminal of the fourth amplifier AMP4 is connected to the fourth input repair line IL4.

The via lines LL1, LL2, LL3, and LL4 are disposed on the PCB. The first via line LL1 is connected to the first amplifier AMP1, the second via line LL2 is connected to the second amplifier AMP2, the third via line LL3 is connected to the third amplifier AMP3, and the fourth via line LL4 is connected to the fourth amplifier AMP4. The first via line LL1 is connected to the output terminal of the first amplifier AMP1 through a transmission line 22 of the second connection portion FOG2, the second via line LL2 is connected to the output terminal of the second amplifier FOG2 through a transmission line 33 of the third connection portion FOG3, the third via line LL3 is connected to the output terminal of the third amplifier FOG3 through a transmission line 55 of the fifth connection portion FOG5, and the fourth via line LL4 is connected to the output terminal of the fourth amplifier FOG4 through a transmission line 66 of the sixth connection portion FOG6.

The output repair lines OL1, OL2, OL3 and OL4 are disposed in the non-display area 301b of the first substrate 301.

One side of the sides of the display area 301a facing the aforementioned second side of the display area 301a is defined as a third side, and one side of the sides of the first substrate 301 facing the third side is defined as a fourth side. In addition, the other two facing sides of the sides of the display area 301a are defined as a fifth side and a sixth side, respectively. One side of the sides of the first substrate 301 facing the fifth side is defined as a seventh side, and one side of the sides of the first substrate 301 facing the sixth side is defined as an eighth side.

The third side includes another side of the first divided display area A1, another side of the second divided display area A2, another side of the third divided display area A3, and another side of the fourth divided display area A4. For example, when one side of the sides of the first divided display area A1 facing the first divided side is defined as a fifth divided side, one side of the sides of the second divided display area A2 facing the second divided side is defined as a sixth divided side, one side of the sides of the third divided display area A3 facing the third divided side is defined as a seventh divided side, and one side of the sides of the fourth divided display area A4 facing the fourth divided side is defined as an eighth divided side, the third side includes the fifth, sixth, seventh, and eighth divided sides.

A portion of the first output repair line OL1 is disposed in the non-display area 301b between the third side and the fourth side. For example, a portion of the first output repair line OL1 is disposed between the fifth divided side and the fourth side. Another portion of the first output repair line OL1 is disposed in the non-display area 301b between the fifth side and the seventh side.

A portion of the second output repair line OL2 is disposed in the non-display area 301b between the third side and the fourth side. For example, a portion of the second output repair line OL2 is disposed between the fifth divided side and the fourth side and also between the sixth divided side and the fourth side. Another portion of the second output repair line OL2 is disposed in the non-display area 301b between the fifth side and the seventh side.

A portion of the third output repair line OL3 is disposed in the non-display area 301b between the third side and the fourth side. For example, a portion of the third output repair line OL3 is disposed between the eighth divided side and the fourth side and also between the seventh divided side and the fourth side. Another portion of the third output repair line OL3 is disposed in the non-display area 301b between the sixth side and the eighth side.

A portion of the fourth output repair line OL4 is disposed in the non-display area 301b between the third side and the fourth side. For example, a portion of the fourth output repair line OL4 is disposed between the eighth divided side and the fourth side. Another portion of the fourth output repair line OL4 is disposed in the non-display area 301b between the sixth side and the eighth side.

The output repair lines OL1, OL2, OL3, and OL4 intersect the data lines DL in the non-display area 301b. For example, a portion of the first output repair line OL1 intersects data lines DL extending from the first divided display area A1 to the non-display area 301b, a portion of the second output repair line OL2 intersects data lines DL extending from the second divided display area A2 to the non-display area 301b, a portion of the third output repair line OL3 intersects data lines DL extending from the third divided display area A3 to the non-display area 301b, and a portion of the fourth output repair line OL4 intersects data lines DL extending from the fourth divided display area A4 to the non-display area 301b.

The first output repair line OL1 is connected to the first via line LL1. For example, another portion of the first output repair line OL1 is connected to the first via line LL1 through a transmission line 11 of the first connection portion FOG1. The second output repair line OL2 is connected to the second via line LL2. For example, another portion of the second output repair line OL2 is connected to the second via line LL2 through another transmission line 11' of the first connection portion FOG1. The third output repair line OL3 is connected to the third via line LL3. For example, another portion of the third output repair line OL3 is connected to the third via line LL3 through another transmission line 66' of the sixth connection portion FOG6. The fourth output repair line OL4 is connected to the fourth via line LL4. For example, another portion of the fourth output repair line OL4 is connected to the fourth via line LL4 through still another transmission line 66" of the sixth connection portion FOG6.

Although not illustrated in FIG. 1, in an exemplary embodiment, the display device may further include a plurality of gate lines and a plurality of gate driving ICs. The gate lines may be disposed in the display area 301a to intersect the data lines of FIG. 1. The gate lines may extend to the non-display area 301b to be connected to the gate driving ICs. The gate driving ICs may be disposed in the non-display area 301b. In an exemplary embodiment, although not illustrated, the display device may further include another plurality of input repair lines intersecting gate link lines connected to the gate lines, and another plurality of output repair lines intersecting the aforementioned gate lines.

Figure 5:
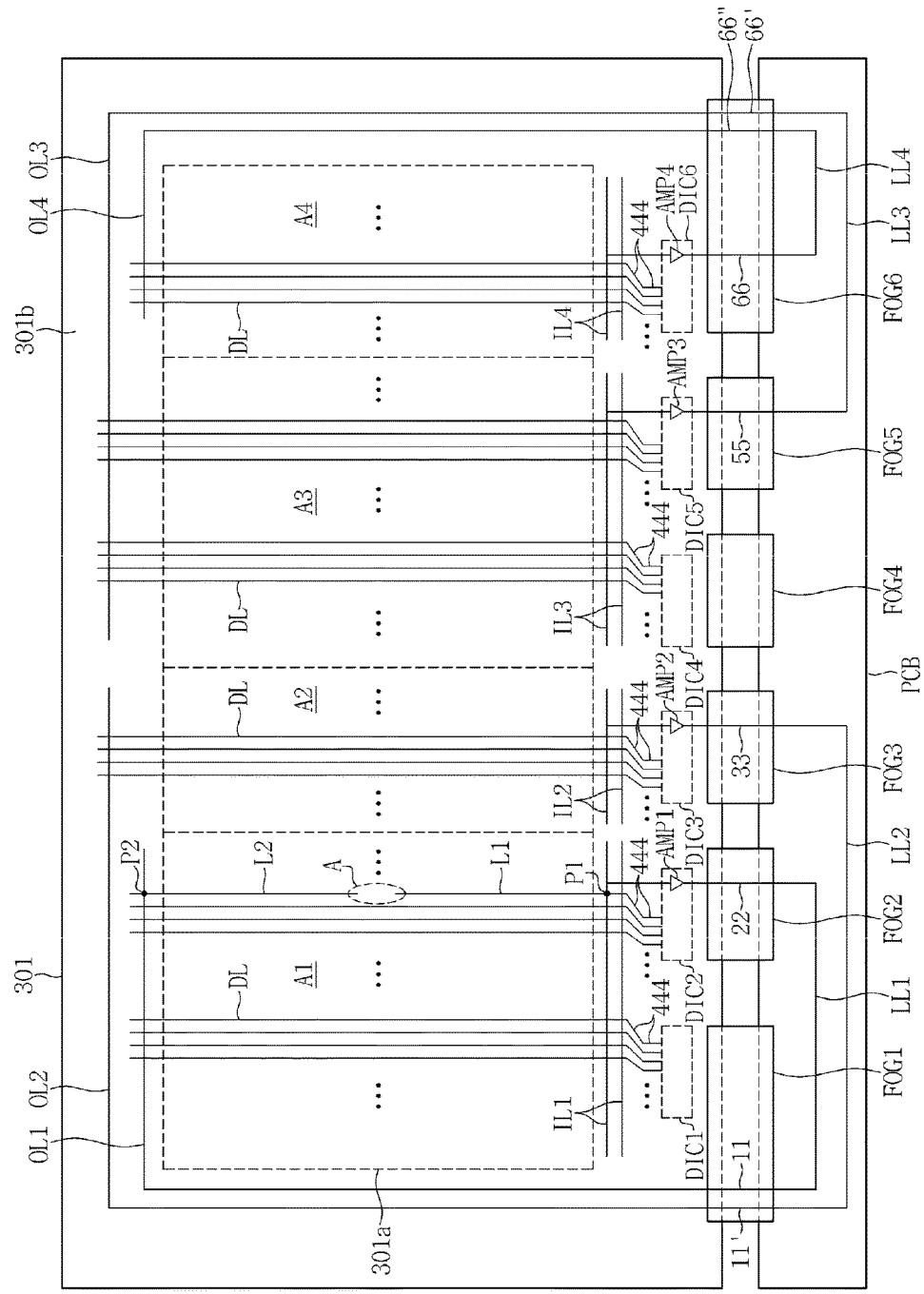
FIG. 5 is a view illustrating a method of repairing a disconnected data line among data lines of the display device of FIG. 1 according to some exemplary embodiments.

FIG. 5 is a view illustrating a method of repairing a disconnected data line among data lines of the display device of FIG. 1 according to some exemplary embodiments.

As illustrated in FIG. 5, when a data line DL is disconnected at a point A, the data line DL is divided into two lines L1 and L2. Herein, one of the two lines connected to the link line 444 is defined as a first divided line L1, and the other of the two lines is defined as a second divided line L2. The second divided line L2 intersects the first output repair line OL1.

When such a disconnection occurs, a short-circuiting process is performed between the first input repair line IL1 and the link line 444 at the point P1. This short-circuiting process may be performed using a laser irradiation apparatus. When a laser beam from the laser irradiation apparatus is irradiated to the point P1, an insulating layer between the first input repair line IL1 and the link line 444 is broken, and the first input repair line IL1 and the link line 444 are connected to each other. Accordingly, the first input repair line IL1 and the first divided line L1 may be electrically connected to each other. That is, the first divided line L1 may be connected to the first input repair line IL1 through the link line 444.

A short-circuiting process is performed at a point P2 between the first output repair line OL1 and the second divided line L2. This short-circuiting process may be performed using the aforementioned laser irradiation apparatus. When a laser beam is irradiated to the point P2, an insulating layer between the first output repair line OL1 and the second divided line L2 is broken, and the first output repair line OL1 and the second divided line L2 are connected to each other.

A cutting process is performed to cut a short-circuit line (not illustrated) of the first amplifier AMP1. This cutting process may be performed by laser. When a laser beam passes across the short-circuit line of the first amplifier AMP1, the short-circuit line is cut off. As the short-circuit line is cut off, electric connection is established between the input terminal and the output terminal of the first amplifier AMP1. Accordingly, an image data signal applied from the second data driving IC DIC2 to the link line 444 may be transmitted to the first divided line L1 and the first input repair line IL1.

The image data signal applied to the first input repair line IL1 is input to the input terminal of the first amplifier AMP1. The first amplifier AMP1 amplifies the image data signal input to its input terminal and then outputs the amplified image data signal. The image data signal output from the output terminal of the first amplifier AMP1 is applied to the second divided line L2 through the transmission line 22 of the second connection portion FOG2, the first via line LL1, the transmission line 11 of the first connection portion FOG1, and the first output repair line OL1. Accordingly, the same image data signal as the image data signal of the first divided line L1 may also be applied to the second divided line L2.

Figure 6:
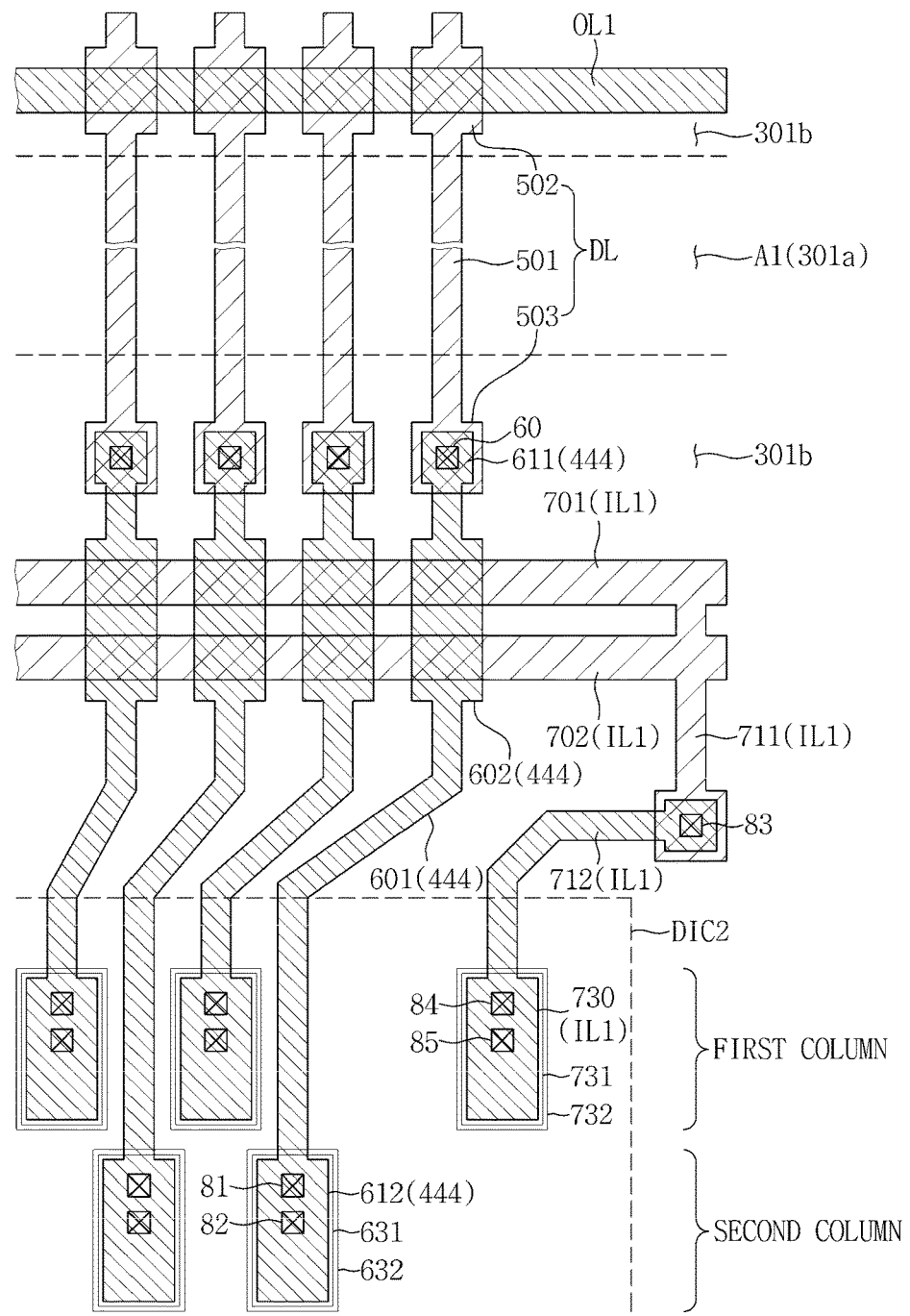
FIG. 6 is a configuration view illustrating a portion of a first divided display area of the display device of FIG. 1 and surrounding components according to some exemplary embodiments.

FIG. 6 is a configuration view illustrating a portion of a first divided display area of the display device of FIG. 1 and surrounding components according to some exemplary embodiments.

As illustrated in FIG. 6, the data line DL in the first divided display area A1 includes a line portion 501, an overlap portion 502, and a pad portion 503. It is noted, however, that the data line DL in FIG. 6 is not cut off, but is depicted in a partially omitted manner. The overlap portion 502 of the data line DL overlaps the first output repair line OL1 in the non-display area 301b. The pad portion 503 of the data line DL is connected to the link line 444 through a contact hole 60 in the non-display area 301b. Each of the overlap portion 502 and the pad portion 503 of the data line DL has a width (line width) greater than a width of the line portion 501 thereof.

The link line 444 has a bent shape. The link line 444 includes a line portion 601, an overlap portion 602, a first pad portion 611, and a second pad portion 612.

The first pad portion 611 of the link line 444 is connected to the pad portion 503 of the data line DL described above, and the second pad portion 612 of the link line 444 is connected to a data output terminal (not illustrated) of the second data driving IC DIC2.

A first pad electrode 631 and a second pad electrode 632 may be disposed vertically between the second pad portion 612 of the link line 444 and the output terminal of the second data driving IC DIC2. The second pad electrode 632 is disposed between the first pad electrode 631 and the output terminal of the second data driving IC DIC2.

The first pad electrode 631 is connected to the second pad portion 612 through a contact hole 81 passing through the gate insulating layer 311. The first pad electrode 631 may include substantially a same material as that included in the data line DL described above.

The second pad electrode 632 is connected to the first pad electrode 631 through a contact hole 82 passing through the second protective layer 322, the insulating interlayer 352, and the first protective layer 321. The second pad electrode 632 may include substantially a same material as that included in the pixel electrode PE described above.

The second pad portion 612 of the link line 444 is electrically connected to the data output terminal of the second data driving IC DIC2 through the first pad electrode 631 and the second pad electrode 632.

The overlap portion 602 of the link line 444 overlaps the first input repair line IL1.

The overlap portion 602, the first pad portion 611, and the second pad portion 612 of the link line 444 have a width (line width) greater than a width of the line portion 601 of the link line 444.

A second pad portion of an odd-numbered link line 444 among the link lines 444 in each of the divided display areas A1, A2, A3, and A4, and a second pad portion of an even-numbered link line 444 among the link lines 444 may be disposed in different columns. For example, each of the second pad portions of the odd-numbered link lines 444 among the link lines 444 in the first divided display area A1 may be disposed along a first column, and each of the second pad portions of the even-numbered link lines 444 among the link lines 444 may be disposed along a second column. The second pad portion in the first column is disposed more adjacent to the input repair line than the second pad portion in the second column.

The first input repair line IL1 includes a first line portion 701, a second line portion 702, a first extension portion 711, a second extension portion 712, and a pad portion 730.

The first line portion 701 and the second line portion 702 face each other. An end portion of the first line portion 701 and an end portion of the second line portion 702 are connected to each other. The first line portion 701 overlaps a portion of the overlap portion 602 provided in the link line 444. The second line portion 702 overlaps another portion of the overlap portion 602 provided in the link line 444.

The first extension portion 711 extends vertically from the second line portion 702 toward the first side of the first substrate 301. The first extension portion 711, the first line portion 701, and the second line portion 702 may include substantially a same material as one another. In such an exemplary embodiment, the first extension portion 711, the first line portion 701, and the second line portion 702 may be unitary.

The second extension portion 712 extends from the first extension portion 711 toward the second data driving IC DIC2. The second extension portion 712 may include a different material from that included in the first extension portion 711. The second extension portion 712 is disposed on a different layer from a layer on which the first extension portion 711 is disposed. The second extension portion 712 is connected to the first extension portion 711 through a contact hole 83 passing through the gate insulating layer 311.

Although not illustrated, the second extension portion 712 may unitary with the first extension portion 711. In other words, the second extension portion 712, the first extension portion 711, the second line portion 702, and the first line portion 701 may include substantially a same material as one another. In such an exemplary embodiment, the second extension portion 712, the first extension portion 711, the second line portion 702, and the first line portion 701 may be unitary.

A first pad electrode 731 and a second pad electrode 732 may be formed vertically between the pad portion 730 of the first input repair line IL1 and an input terminal (not illustrated) of the second data driving IC DIC2. The second pad electrode 732 is disposed between the first pad electrode 731 and the input terminal of the second data driving IC DIC2. The input terminal of the second data driving IC DIC2 is the input terminal of the first amplifier AMP1.

The first pad electrode 731 is connected to the pad portion 730 through a contact hole 84 passing through the gate insulating layer 311. The first pad electrode 731 may include substantially a same material as that included in the data line DL described above.

The second pad electrode 732 is connected to the first pad electrode 731 through a contact hole 85 passing through the second protective layer 322, the insulating interlayer 352, and the first protective layer 321. The second pad electrode 732 may include substantially a same material as that included in the pixel electrode PE described above.

The pad portion 730 of the first input repair line IL1 is electrically connected to the input terminal of the second data driving IC DIC2 through the first pad electrode 731 and the second pad electrode 732.

Figure 7:
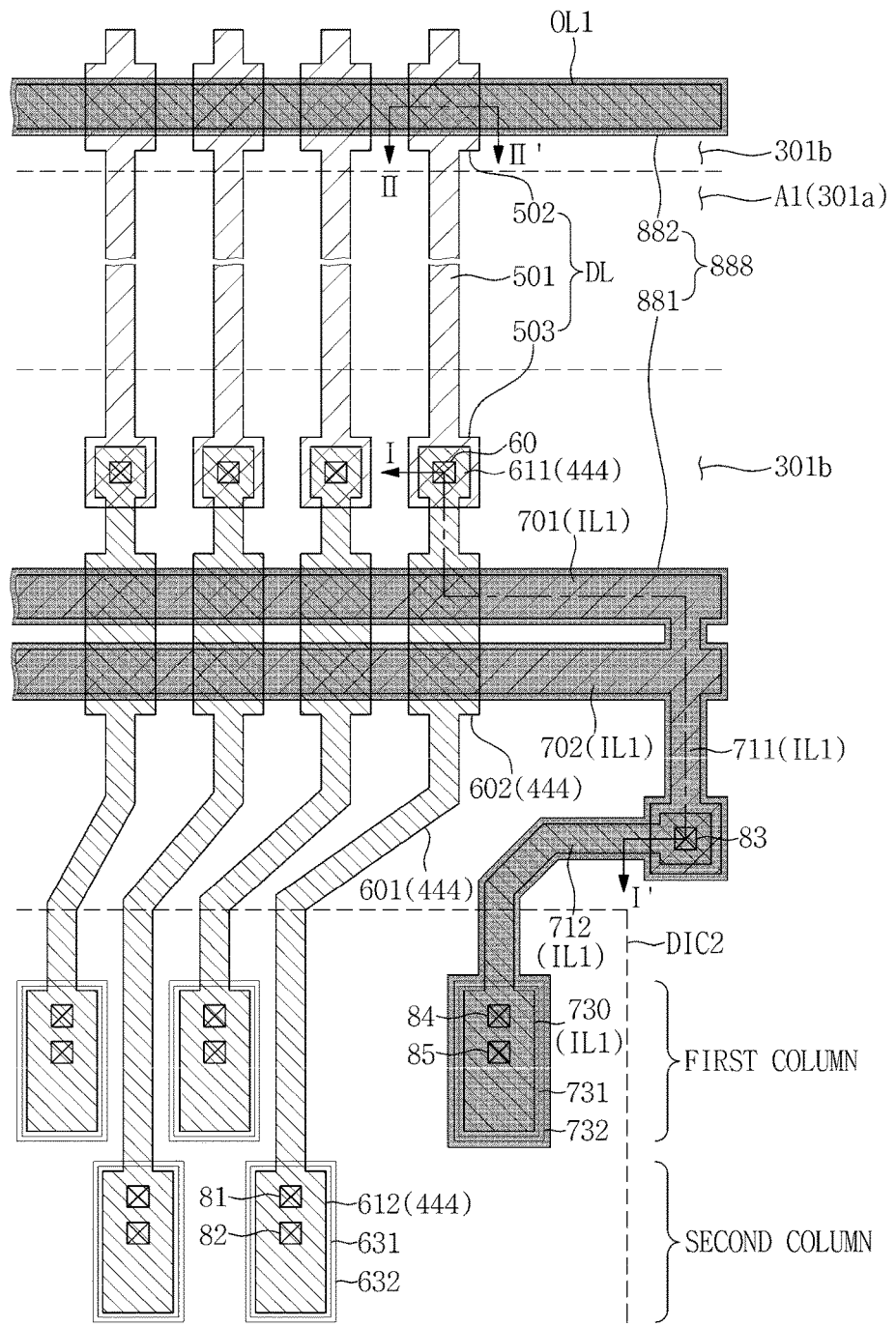
FIG. 7 is a view illustrating components depicted in FIG. 6 and a portion of a dummy line of the display device of FIG. 1 according to some exemplary embodiments.
Figure 8:
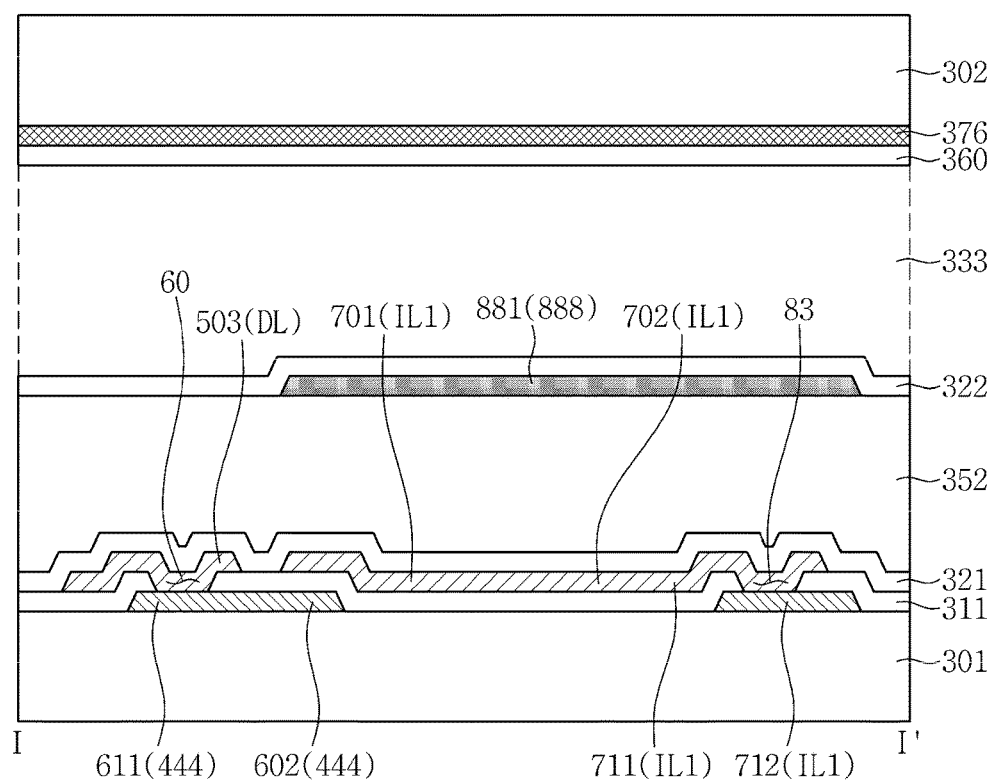
FIG. 8 is a cross-sectional view of the display device of FIG. 1 taken along sectional line I-I' of FIG. 7 according to some exemplary embodiments.
Figure 9:
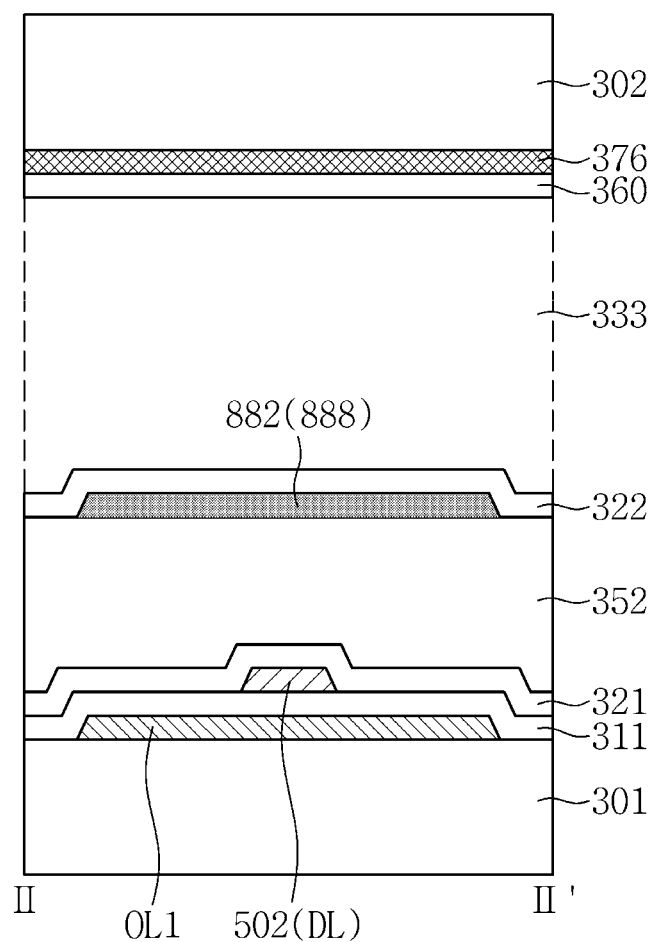
FIG. 9 is a cross-sectional view of the display device of FIG. 1 taken along sectional line II-II' of FIG. 7 according to some exemplary embodiments.

FIG. 7 is a view illustrating components depicted in FIG. 6 and a portion of a dummy line of the display device of FIG. 1 according to some exemplary embodiments. FIG. 8 is a cross-sectional view of the display device of FIG. 1 taken along sectional line I-I' of FIG. 7 according to some exemplary embodiments. FIG. 9 is a cross-sectional view of the display device of FIG. 1 taken along sectional line II-II' of FIG. 7 according to some exemplary embodiments.

As illustrated in FIGS. 7, 8, and 9, a dummy line 888 overlaps the first input repair line IL1 and the first output repair line OL1. Although not illustrated, the dummy line 888 may overlap all of the input repair lines IL1, IL2, IL3, and IL4 and all of the output repair lines OL1, OL2, OL3, and OL4.

The dummy line 888 may include a first dummy line 881 and a second dummy line 882. The first dummy line 881 overlaps the first input repair line IL1, and the second dummy line 882 overlaps the first output repair line OL1. Although not illustrated, the first dummy line 881 may overlap all of the input repair lines IL1, IL2, IL3, and IL4, and the second dummy line 882 may overlap all of the output repair lines OL1, OL2, OL3, and OL4.

The first dummy line 881 overlaps the entirety of the first input repair line IL1. In a plan view as in FIG. 7, the first dummy line 881 may have a larger area than an area of the first input repair line IL1. Although not illustrated, in a plan view as in FIG. 7, the first dummy line 881 may have substantially a same area as the area of the first input repair line IL1. The first dummy line 881 may have substantially a same shape as a shape of the first input repair line IL1.

In an exemplary embodiment, although not illustrated, the display device may further include three other first dummy lines 881 that overlap the entirety of each of the second, third, and fourth input repair lines IL2, IL3, and IL4, respectively.

The second dummy line 882 overlaps the entirety of the first output repair line OL1. In a plan view as in FIG. 7, the second dummy line 882 may have a larger area than an area of the first output repair line OL1. Although not illustrated, in a plan view as in FIG. 7, the second dummy line 882 may have substantially a same area as an area of the first output repair line OL1. The second dummy line 882 may have substantially a same shape as a shape of the first output repair line OL1.

Although not illustrated, in an exemplary embodiment, the display device may further include three other second dummy lines 882 that overlap the entirety of each of the second, third, and fourth output repair lines OL2, OL3, and OL4, respectively.

Referring to FIGS. 8 and 9, a relationship among the data line DL, the link line 444, the first input repair line ILL and the first dummy line 881 viewed along the vertical direction will be described below.

The link line 444, the second extension portion 712 of the first input repair line IL1, and the first output repair line OL1 are disposed on the first substrate 301. Each of the link line 444, the second extension portion 712 of the first input repair line IL1, and the first output repair line OL1 may include substantially a same material as one another and have substantially a same structure (e.g., a multilayer structure) as those of the gate electrode GE. The link line 444, the second extension portion 712 of the first input repair line IL1, the first output repair line OL1, and the gate electrode GE may be simultaneously formed in substantially a same process.

The gate insulating layer 311 is disposed on the link line 444, the second extension portion 712 of the first input repair line IL1, and the first output repair line OL1. The data line DL, the first line portion 701 of the first input repair line IL1, the second line portion 702 of the first input repair line IL1, and the first extension portion 711 of the first input repair line IL1 are disposed on the gate insulating layer 311.

The data line DL is connected to the first pad portion 611 of the link line 444 through the contact hole 60 of the gate insulating layer 311. The first extension portion 711 of the first input repair line IL1 is connected to the second extension portion 712 of the first input repair line IL1 through another contact hole 83 of the gate insulating layer 311.

Each of the first line portion 701 of the first input repair line IL1, the second line portion 702 of the first input repair line IL1, and the first extension portion 711 of the first input repair line IL1 may include substantially a same material as one another and may have substantially a same structure (e.g., a multi-layer structure) as those of the data line DL described above. The first line portion 701 of the first input repair line IL1, the second line portion 702 of the first input repair line IL1, the first extension portion 711 of the first input repair line IL1, and the data lines DL may be simultaneously formed in substantially a same process.

The first protective layer 321 is disposed on the data line DL, the first line portion 701 of the first input repair line IL1, the second line portion 702 of the first input repair line IL1, and the first extension portion 711 of the first input repair line IL1. The insulating interlayer 352 is disposed on the first protective layer 321.

The first dummy line 881 and the second dummy line 882 are disposed on the insulating interlayer 352. The first dummy line 881 and the second dummy line 882 may include substantially a same material as one another and may have substantially a same structure (e.g., a multilayer structure) as those of the common line 383 described above. The first dummy line 881, the second dummy line 882, and the common line 383 may be simultaneously formed in substantially a same process. The second protective layer 322 is disposed on the first dummy line 881 and the second dummy line 882.

Figure 10:
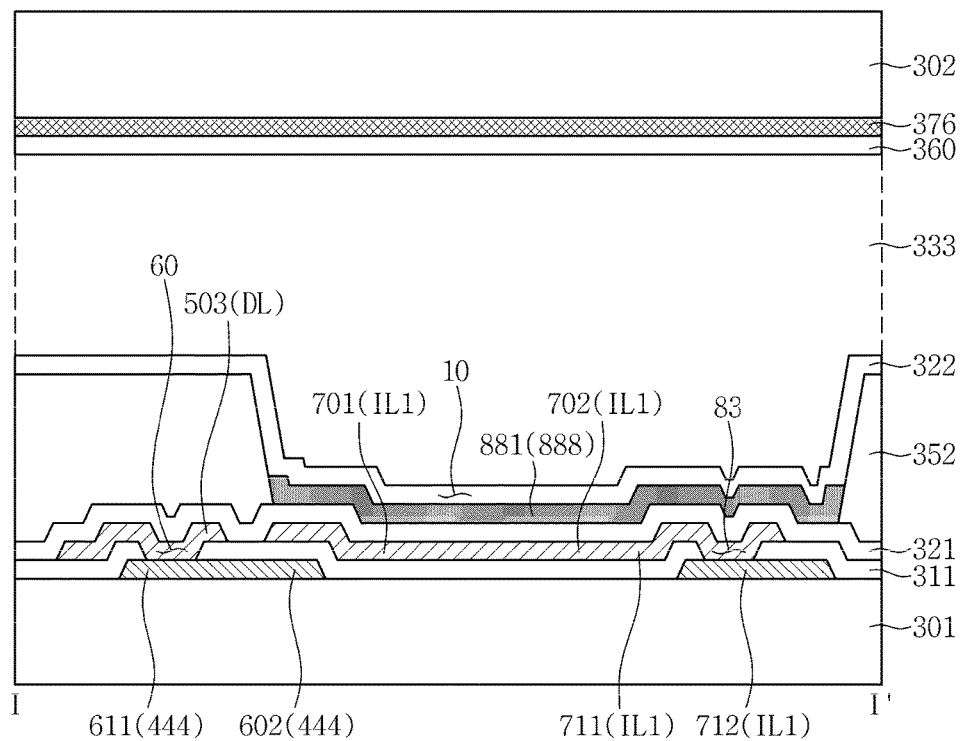
FIG. 10 is a cross-sectional view of a display device taken along sectional line I-I' of FIG. 7 according to some exemplary embodiments.
Figure 11:
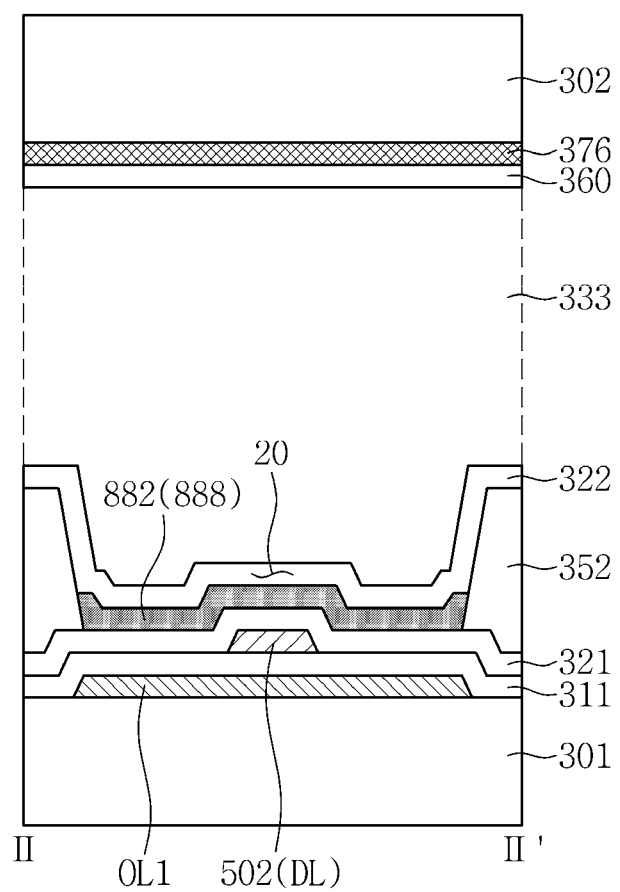
FIG. 11 is a cross-sectional view of a display device taken along sectional line II-II' of FIG. 7 according to some exemplary embodiments.

FIG. 10 is a cross-sectional view of a display device taken along sectional line I-I' of FIG. 7 according to some exemplary embodiments. FIG. 11 is a cross-sectional view of a display device taken along sectional line II-II' of FIG. 7 according to some exemplary embodiments.

As illustrated in FIG. 10, the insulating interlayer 352 may have a first hole 10 in a portion corresponding to the first dummy line 881. In other words, the first dummy line 881 is disposed in the first hole 10 of the insulating interlayer 352. Accordingly, the first dummy line 881 contacts the first protective layer 321. The first dummy line 881 is disposed between the first protective layer 321 and the second protective layer 322. In this manner, the first dummy line 881 of FIG. 10 is more adjacent to the first input repair line IL1 than the first dummy line 881 of FIG. 8. In an exemplary embodiment, although not illustrated, the insulating interlayer 352 may have the first hole 10 in a selective manner only in an overlap area among the first dummy line 881, the first input repair line IL1, and the link line 444.

As illustrated in FIG. 11, the insulating interlayer 352 may have a second hole 20 in a portion corresponding to the second dummy line 882. That is, the second dummy line 882 is disposed in the second hole 20 of the insulating interlayer 352. Accordingly, the second dummy line 882 contacts the first protective layer 321. The second dummy line 882 is disposed between the first protective layer 321 and the second protective layer 322. The second dummy line 882 of FIG. 11 is disposed more adjacent to the first output repair line OL1 than the second dummy line 882 of FIG. 9. In an exemplary embodiment, although not illustrated, the insulating interlayer 352 may have the second hole 20 in a selective manner only in an overlap area among the second dummy line 882, the first output repair line OL1, and the data line DL.

According to one or more exemplary embodiments, the dummy line 888 may be made to contact a corresponding repair line during a repair process of the data line DL. In this manner, resistance of the corresponding repair line may be reduced. Accordingly, for example, an image data signal of the first divided line L1 may be transmitted to the second divided line L2 substantially without distortion.

Figure 12:
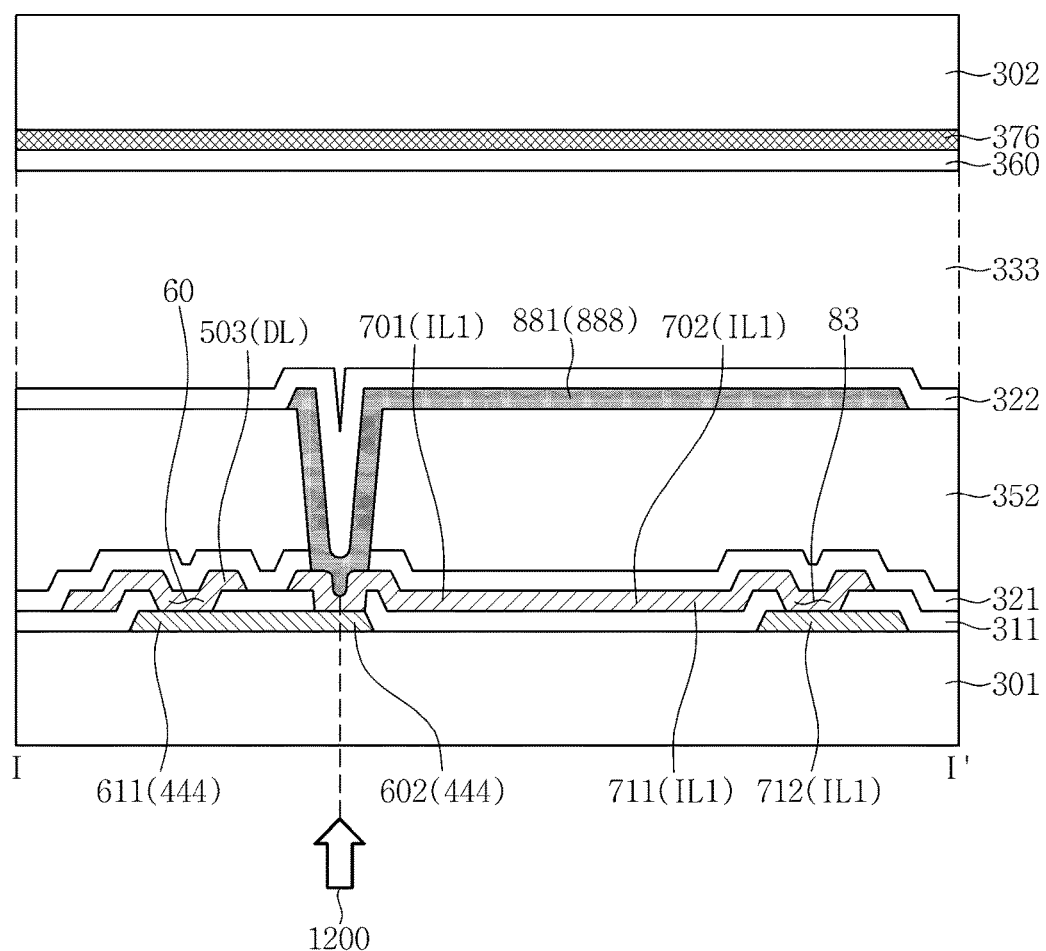
FIG. 12 is a view illustrating a repair process using a first dummy line according to the configuration of FIG. 8 according to some exemplary embodiments.

FIG. 12 is a view illustrating a repair process using a first dummy line according to the configuration of FIG. 8 according to some exemplary embodiments.

As illustrated in FIG. 12, a laser beam from a laser irradiation apparatus is irradiated from a lower portion of the first substrate 301 in a direction of arrow 1200. The laser beam passes through the first substrate 301 to be irradiated to the overlap portion 602 of the link line 444, the gate insulating layer 311, the first input repair line IL1, the first protective layer 321, the insulating interlayer 352, and the first dummy line 881. Accordingly, the gate insulating layer 311, the first protective layer 321, and the insulating interlayer 352 are damaged in an overlap area among the overlap portion 602 of the link line 444, the first input repair line IL1, and the first dummy line 881. In addition, the overlap portion 602 of the link line 444, the first input repair line IL1, and the first dummy line 881 are melted in the overlap area and made to be in contact with one another. That is, the overlap portion 602 of the link line 444, the first input repair line ILL and the first dummy line 881 are electrically connected to one another in the overlap area. As the first dummy line 881 is connected to the first input repair line IL1, the resistance of the first input repair line IL1 may be reduced.

Although not illustrated, a second dummy line 882 having the structure illustrated in FIG. 9 may also be connected to the first output repair line OL1 and the data line DL by laser irradiation. As the second dummy line 882 is made to be connected to the first output repair line OL1, the resistance of the first output repair line OL1 may be reduced.

Figure 13:
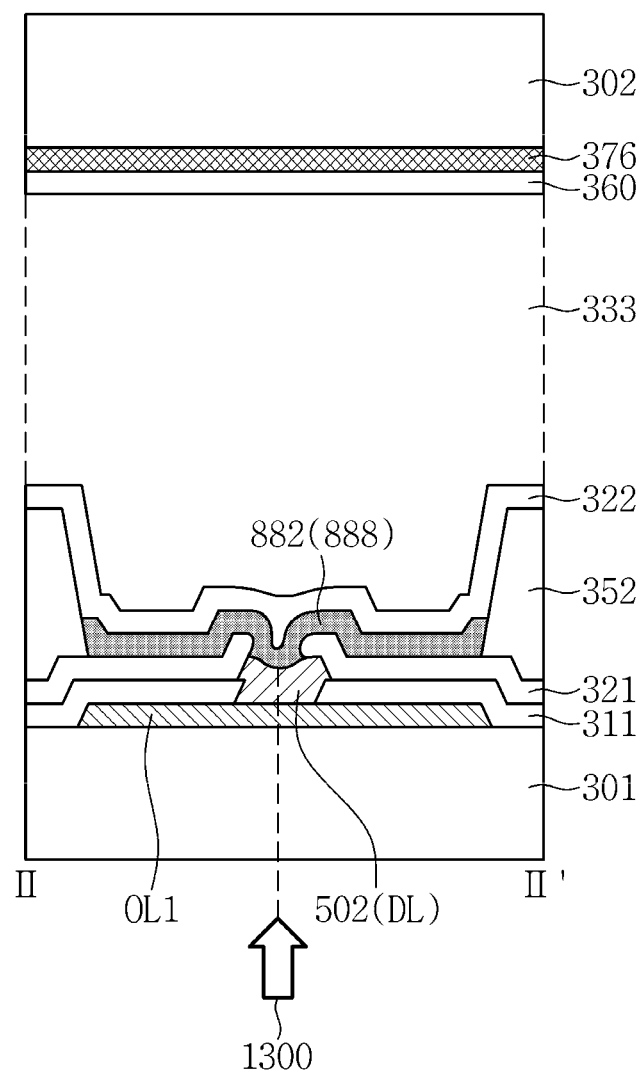
FIG. 13 is a view illustrating a repair process using a second dummy line according to the configuration of FIG. 11 according to some exemplary embodiments.

FIG. 13 is a view illustrating a repair process using a second dummy line according to the configuration of FIG. 11 according to some exemplary embodiments.

As illustrated in FIG. 13, a laser beam from a laser irradiation apparatus is irradiated from a lower portion of the first substrate 301 in a direction of arrow 1300. The laser beam passes through the first substrate 301 to be irradiated to the first output repair line OL1, the gate insulating layer 311, the data line DL, the first protective layer 321, and the second dummy line 882. Accordingly, the gate insulating layer 311 and the first protective layer 321 are damaged in an overlap area among the first output repair line OL1, the data line DL, and the second dummy line 882. In addition, the first output repair line OL1, the data line DL, and the second dummy line 882 are melted in the overlap area to be made in contact with one another. That is, the first output repair line OL1, the data line DL, and the second dummy line 882 are electrically connected to one another in the overlap area. As the second dummy line 882 is made to be connected to the first output repair line OL1 through the data line DL, the resistance of the first output repair line OL1 may be reduced.

Figure 14:
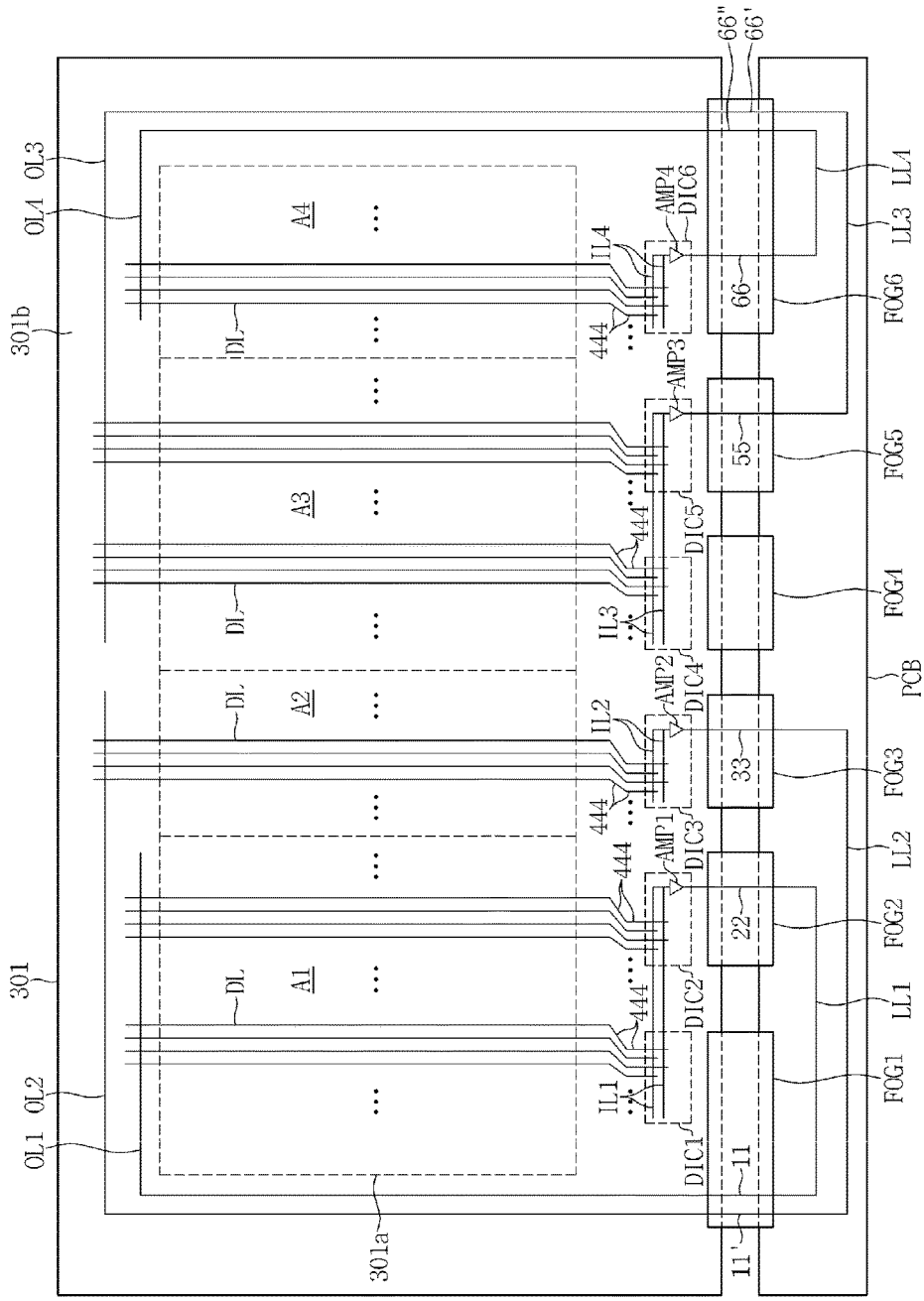
FIG. 14 is a view illustrating a display device according to some exemplary embodiments.

FIG. 14 is a view illustrating a display device according to some exemplary embodiments. The display device of FIG. 14 is similar to the display device of FIG. 1, and, as such, primarily differences are described below.

As illustrated in FIG. 14, the display device includes a first substrate 301, a plurality of data driving ICs DIC1, DIC2, DIC3, DIC4, DIC5, and DIC6, a plurality of connection portions FOG1, FOG2, FOG3, FOG4, FOG5, and FOG6, a plurality of input repair lines IL1, IL2, IL3, and IL4, a plurality of output repair lines OL1, OL2, OL3, and OL4, a plurality of via lines LL1, LL2, LL3, and LL4, a plurality of data lines DL, a plurality of amplifiers AMP1, AMP2, AMP3, and AMP4, and a PCB.

When one side of the sides of the first substrate 301 overlapping the connection portions FOG1, FOG2, FOG3, FOG4, FOG5, and FOG6 is defined as a first side and one side of the sides of a display area 301a facing the first side is defined as a second side, the input repair lines IL1, IL2, IL3, and IL4 may be disposed in a non-display area 301b between the first side and the second side.

The second side includes one side of a first divided display area A1, one side of a second divided display area A2, one side of a third divided display area A3, and one side of a fourth divided display area A4. For example, when one side of the sides of the first divided display area A1 facing the first side is defined as a first divided side, one side of the sides of the second divided display area A2 facing the first side is defined as a second divided side, one side of the sides of the third divided display area A3 facing the first side is defined as a third divided side, and one side of the sides of the fourth divided display area A4 facing the first side is defined as a fourth divided side, the second side includes the first, second, third, and fourth divided sides.

The first input repair line IL1 is disposed between the first side and the first divided side, the second input repair line IL2 is disposed between the first side and the second divided side, the third input repair line IL3 is disposed between the first side and the third divided side, and the fourth input repair line IL4 is disposed between the first side and the fourth divided side.

When viewed along the vertical direction, a portion of the first input repair line IL1 is disposed between the first data driving IC DIC1 and the first substrate 301 and also between the second data driving IC DIC2 and the first substrate 301. When viewed along the vertical direction, the second input repair line IL2 is disposed between the third data driving IC DIC3 and the first substrate 301. When viewed along the vertical direction, a portion of the third input repair line IL3 is disposed between the fourth data driving IC DIC4 and the first substrate 301 and also between the fifth data driving IC DIC5 and the first substrate 301. When viewed along the vertical direction, the fourth input repair line IL4 is disposed between the sixth data driving IC DIC6 and the first substrate 301. The input repair lines IL1, IL2, IL3, and IL4 intersect the link lines 444 in the non-display area 301b between the first side and the second side described above.

Each link line 444 connected to data lines DL in the first divided display area A1 is defined as a first link line, each link line 444 connected to data lines DL in the second divided display area A2 is defined as a second link line, each link line 444 connected to data lines DL in the third divided display area A3 is defined as a third link line, and each link line 444 connected to data lines DL in the fourth divided display area A4 is defined as a fourth link line. The first input repair line IL1 intersects the first link lines 444, the second input repair line IL2 intersects the second link lines 444, the third input repair line IL3 intersects the third link lines 444, and the fourth input repair line IL4 intersects the fourth link lines 444. The input repair lines IL1, IL2, IL3, and IL4 are electrically separated from one another.

When viewed along the vertical direction, a portion of the first input repair line IL1 is disposed between an output terminal of the first data driving IC DIC1 and the first link line 444 of the first substrate 301 and also between an output terminal of the second data driving IC DIC2 and the first link line 444 of the first substrate 301. When viewed along the vertical direction, the second input repair line IL2 is disposed between an output terminal of the third data driving IC DIC3 and the second link line 444 of the first substrate 301. When viewed along the vertical direction, a portion of the third input repair line IL3 is disposed between an output terminal of the fourth data driving IC DIC4 and the third link line 444 of the first substrate 301 and also between an output terminal of the fifth data driving IC DIC5 and the third link line 444 of the first substrate 301. When viewed along the vertical direction, the fourth input repair line IL4 is disposed between an output terminal of the sixth data driving IC DIC6 and the fourth link line 444 of the first substrate 301.

As such, at least corresponding portions of the input repair lines IL1, IL2, IL3, and IL4 are disposed between the output terminals of a corresponding data driving and a corresponding link line. In this manner, occupied areas of the input repair lines IL1, IL2, IL3, and IL4 may be reduced in the first substrate 301. Accordingly, the size of the first substrate 301 may be reduced.

The plurality of data driving ICs DIC1, DIC2, DIC3, DIC4, DIC5, and DIC6, the plurality of connection portions FOG1, FOG2, FOG3, FOG4, FOG5, and FOG6, the plurality of input repair lines IL1, IL2, IL3, and IL4, the plurality of output repair lines OL1, OL2, OL3, and OL4, the plurality of via lines LL1, LL2, LL3, and LL4, the plurality of data lines DL, the plurality of amplifiers AMP1, AMP2, AMP3, and AMP4, and the PCB illustrated in FIG. 14 are substantially the same as those illustrated in FIG. 1 except for the differences described above, and, as such, duplicative descriptions are omitted.

In an exemplary embodiment, although not illustrated in FIG. 14, the display device may further include a plurality of gate lines and a plurality of gate driving ICs. The gate lines are disposed in a display area to intersect the data lines in FIG. 14. The gate lines extend to the non-display area 301b and are connected to the gate driving ICs. The gate driving ICs may be disposed in the non-display area 301b. In an exemplary embodiment, although not illustrated, the display device of FIG. 14 may further include another plurality of input repair lines intersecting gate link lines connected to the gate lines, and another plurality of output repair lines intersecting the gate lines. In such an exemplary embodiment, at least a portion of each respective input repair line may be disposed between a corresponding gate link line and a corresponding gate driving IC.

Figure 15:
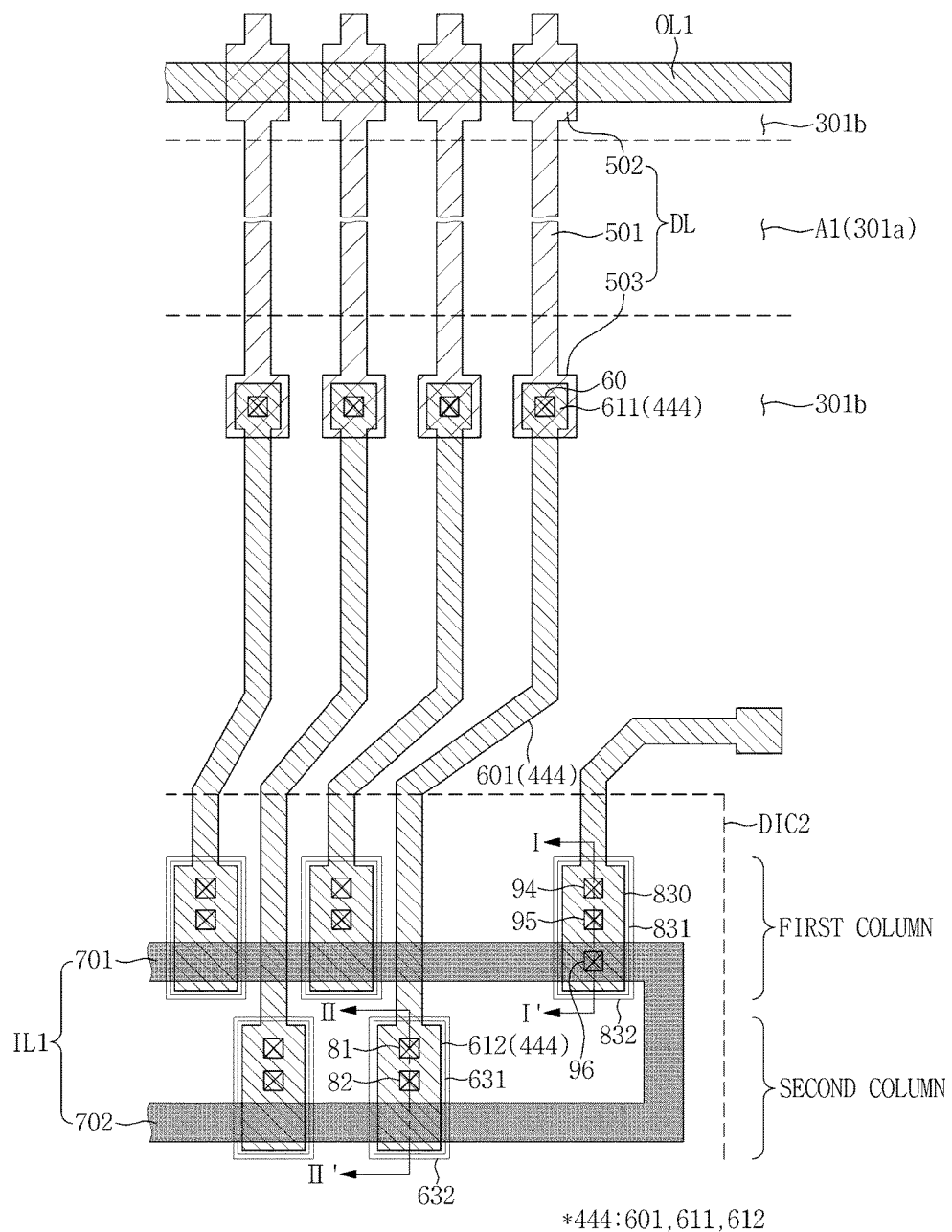
FIG. 15 is a configuration view illustrating a portion of a first divided display area of FIG. 14 and surrounding components according to some exemplary embodiments.

FIG. 15 is a configuration view illustrating a portion of a first divided display area of FIG. 14 and surrounding components according to some exemplary embodiments. The data line DL and a first output repair line OL1 of FIG. 15 are substantially the same as the data line DL and the first output repair line OL1 of FIG. 6, and, therefore, duplicative descriptions are omitted. In an exemplary embodiment, the data line DL in FIG. 15 is not cut off, but is merely depicted in a partially omitted manner.

A link line 444 of FIG. 15 has a bent shape. The link line 444 includes a line portion 601, a first pad portion 611, and a second pad portion 612.

The first pad portion 611 of the link line 444 is connected to a pad portion 503 of the data line DL described above, and the second pad portion 612 of the link line 444 is connected to a data output terminal (not illustrated) of a second data driving IC DIC2.

A first pad electrode 631 and a second pad electrode 632 may be disposed vertically between the second pad portion 612 of the link line 444 and an output terminal of the second data driving IC DIC2. The second pad electrode 632 is disposed between the first pad electrode 631 and the output terminal of the second data driving IC DIC2.

The first pad electrode 631 is connected to the second pad portion 612 through a contact hole 81 passing through a gate insulating layer 311. The first pad electrode 631 may include substantially a same material as that included in the data line DL. The second pad electrode 632 is connected to the first pad electrode 631 through a contact hole 82 passing through a second protective layer 322, an insulating interlayer 352, and a first protective layer 321. The second pad electrode 632 may include substantially a same material as that included in the pixel electrode PE described above.

The second pad portion 612 of the link line 444 is electrically connected to the data output terminal of the second data driving IC DIC2 through the first pad electrode 631 and the second pad electrode 632. The first pad portion 611 and the second pad portion 612 of the link line 444 have a width (line width) greater than a width of the line portion 601 of the link line 444.

A second pad portion 612 of an odd-numbered link line 444 among the link lines 444 in each of divided display areas A1, A2, A3, and A4 and a second pad portion 612 of an even-numbered link line 444 among the link lines 444 may be disposed in different columns from one another. For example, each of the second pad portions 612 of the odd-numbered link lines 444 among the link lines 444 in a first divided display area A1 may be disposed along a first column, and each of the second pad portions 612 of the even-numbered link lines 444 among the link lines 44 may be disposed along a second column. The second pad portion 612 in the first column is disposed more adjacent to a corresponding input repair line (e.g., first input repair line IL1) than the second pad portion 612 in the second column.

The first input repair line IL1 of FIG. 15 includes a first line portion 701 and a second line portion 702. The first line portion 701 and the second line portion 702 face each other. An end portion of the first line portion 701 and an end portion of the second line portion 702 are connected to each other.

The first line portion 701 and the second line portion 702 overlap different second pad portions 612, respectively, among the second pad portions 612 of the link lines 444. For example, the first line portion 701 may overlap the second pad portions 612 of the odd-numbered link lines 444 among the link lines 444, and the second line portion 702 may overlap the second pad portions 612 of the even-numbered link lines 444 among the link lines 444. In such an exemplary embodiment, the first line portion 701 further overlaps a line portion of the even-numbered link line 444.

The first line portion 701 is disposed between the second pad portions 612 of the odd-numbered link lines 444 and the second data driving IC DIC2, and the second line portion 702 is disposed between the second pad portions 612 of the even-numbered link lines 444 and the second data driving IC DIC2. The first line portion 701 and the second line portion 702 may include substantially a same material. In such an exemplary embodiment, the first line portion 701 and the second line portion 702 may be unitary.

Portions of the first line portion 701 are connected to a pad portion 830 through the contact holes 94, 95, and 96. A first pad electrode 831 and a second pad electrode 832 may be disposed vertically between the pad portion 830 and an input terminal (not illustrated) of the second data driving IC DIC2. The second pad electrode 832 is disposed between the first pad electrode 831 and the input terminal of the second data driving IC DIC2. The input terminal of the second data driving IC DIC2 is an input terminal of the first amplifier AMP1.

The first line portion 701 is electrically connected to the input terminal of the second data driving IC DIC2 through the pad portion 830, the first pad electrode 831, and the second pad electrode 832. Accordingly, the first input repair line IL1 may be electrically connected to the input terminal of the first amplifier AMP1.

Figure 16:
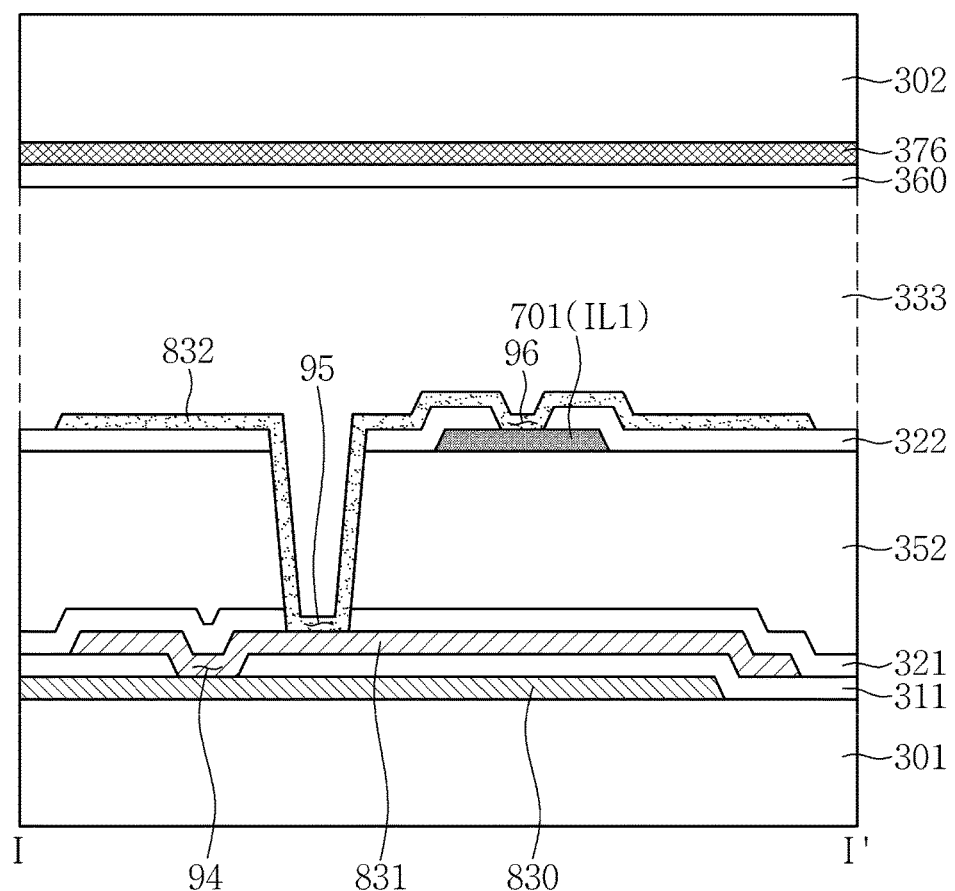
FIG. 16 is a cross-sectional view of the display device of FIG. 14 taken along sectional line I-I' of FIG. 15 according to some exemplary embodiments.

FIG. 16 is a cross-sectional view of the display device of FIG. 14 taken along sectional line I-I' of FIG. 15 according to some exemplary embodiments.

The pad portion 830 is disposed on a first substrate 301. The pad portion 830 may include substantially a same material and may have substantially a same structure (e.g., a multilayer structure) as those of the above-described gate electrode GE. The pad portion 830 and the gate electrode GE may be simultaneously formed in substantially a same process. The gate insulating layer 311 is disposed on the pad portion 830.

The first pad electrode 831 is disposed on the gate insulating layer 311. The first pad electrode 831 is connected to the pad portion 830 through a contact hole 94 of the gate insulating layer 311. The first pad electrode 831 may include substantially a same material and may have substantially a same structure (e.g., a multilayer structure) as those of the data line DL described above. The first pad electrode 831 and the data line DL may be simultaneously formed in substantially a same process.

The first protective layer 321 is disposed on the first pad electrode 831. The insulating interlayer 352 is disposed on the first protective layer 321. The first input repair line IL1 is disposed on the insulating interlayer 352. The first input repair line IL1 may include substantially a same material and may have substantially a same structure (e.g., a multilayer structure) as those of the common line 383 described above. The first input repair line IL1 and the common line 383 may be simultaneously formed in substantially a same process. The second protective layer 322 is disposed on the first input repair line IL1.

The second pad electrode 832 is disposed on the second protective layer 322. The second pad electrode 832 is connected to the first pad electrode 831 through a contact hole 95 passing through the second protective layer 322, the insulating interlayer 352, and the first protective layer 321, and is connected to the first input repair line IL1 through another contact hole 96 passing through the second protective layer 322.

Figure 17:
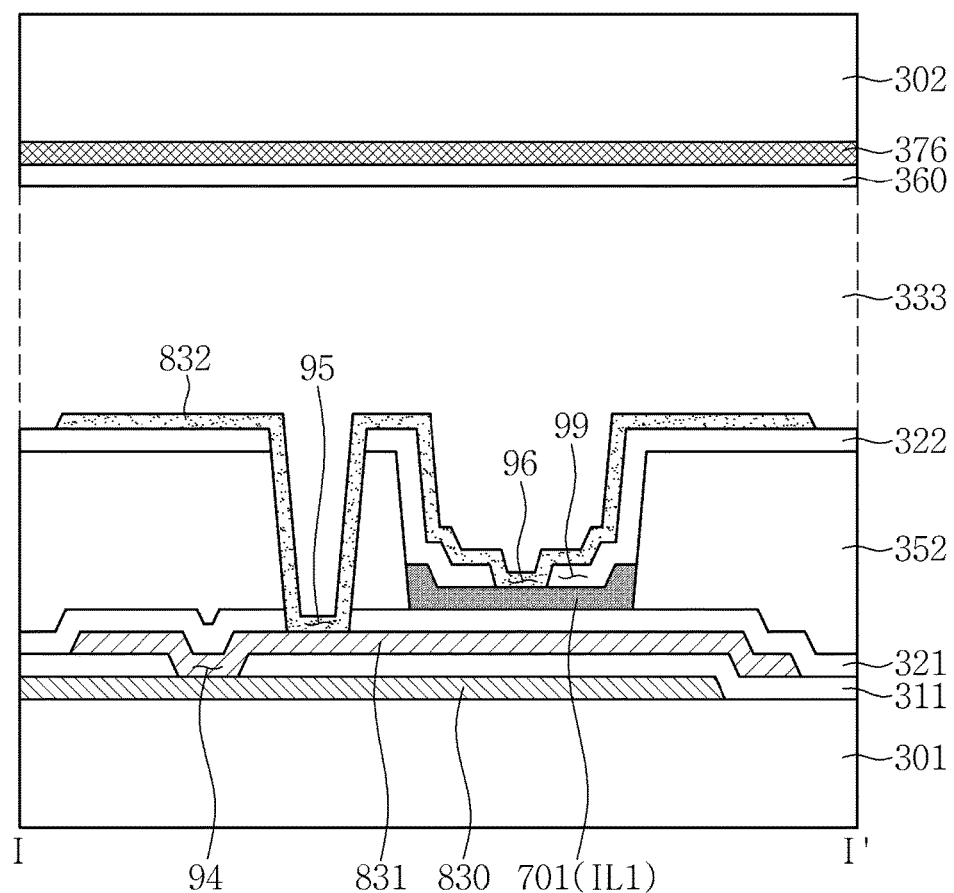
FIG. 17 is a cross-sectional view of a display device taken along sectional line I-I' of FIG. 15 according to some exemplary embodiments.

FIG. 17 is a cross-sectional view of a display device taken along sectional line I-I' of FIG. 15 according to some exemplary embodiments. The display device of FIG. 17 is similar to the display device of FIG. 16, and, as such, primarily differences are described below.

As illustrated in FIG. 17, an insulating interlayer 352 may have a hole 99 in an overlap area between a first input repair line IL1 and a pad portion 830. The first input repair line IL1 is disposed in the hole 99 of the insulating interlayer 352. Accordingly, the first input repair line IL1 contacts a first protective layer 321. The first input repair line IL1 is disposed between the first protective layer 321 and a second protective layer 322. The first input repair line IL1 of FIG. 17 is disposed more adjacent to a first substrate 301 than the first input repair line IL1 of FIG. 16.

Figure 18:
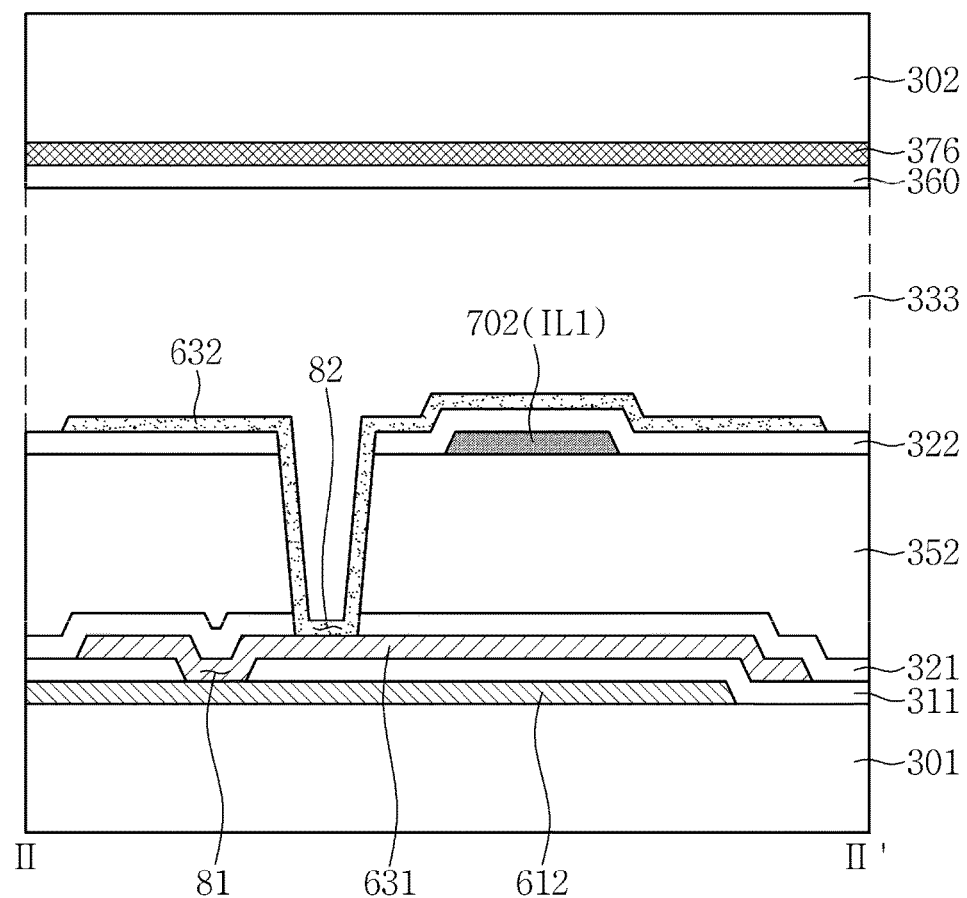
FIG. 18 is a cross-sectional view of the display device of FIG. 14 taken along sectional line II-II' of FIG. 15 according to some exemplary embodiments.

FIG. 18 is a cross-sectional view of the display device of FIG. 14 taken along sectional line II-II' of FIG. 15 according to some exemplary embodiments.

The second pad portion 612 of the link line 444 is disposed on the first substrate 301. The second pad portion 612 may include substantially a same material and may have substantially a same structure (e.g., a multilayer structure) as those of the gate electrode GE described above. The second pad portion 612 and the gate electrode GE may be simultaneously formed in substantially a same process.

The gate insulating layer 311 is disposed on the second pad portion 612. The first pad electrode 631 is disposed on the gate insulating layer 311. The first pad electrode 631 is connected to the second pad portion 612 through the contact hole 81 of the gate insulating layer 311. The first pad electrode 631 may include substantially a same material and may have substantially a same structure (e.g., a multilayer structure) as those of the data line DL described above. The first pad electrode 631 and the data line DL may be simultaneously formed in substantially a same process.

The first protective layer 321 is disposed on the first pad electrode 631. The insulating interlayer 352 is disposed on the first protective layer 321. The first input repair line IL1 is disposed on the insulating interlayer 352. The first input repair line IL1 may include substantially a same material and may have substantially a same structure (e.g., a multilayer structure) as those of the common line 383 described above. The first input repair line IL1 and the common line 383 may be simultaneously formed in substantially a same process.

The second protective layer 322 is disposed on the first input repair line IL1. The second pad electrode 632 is disposed on the second protective layer 322. The second pad electrode 632 is connected to the first pad electrode 631 through the contact hole 82 passing through the second protective layer 322, the insulating interlayer 352 and the first protective layer 321. Although not illustrated, the second pad electrode 632 is connected to the data output terminal of the second data driving IC DIC2.

Figure 19:
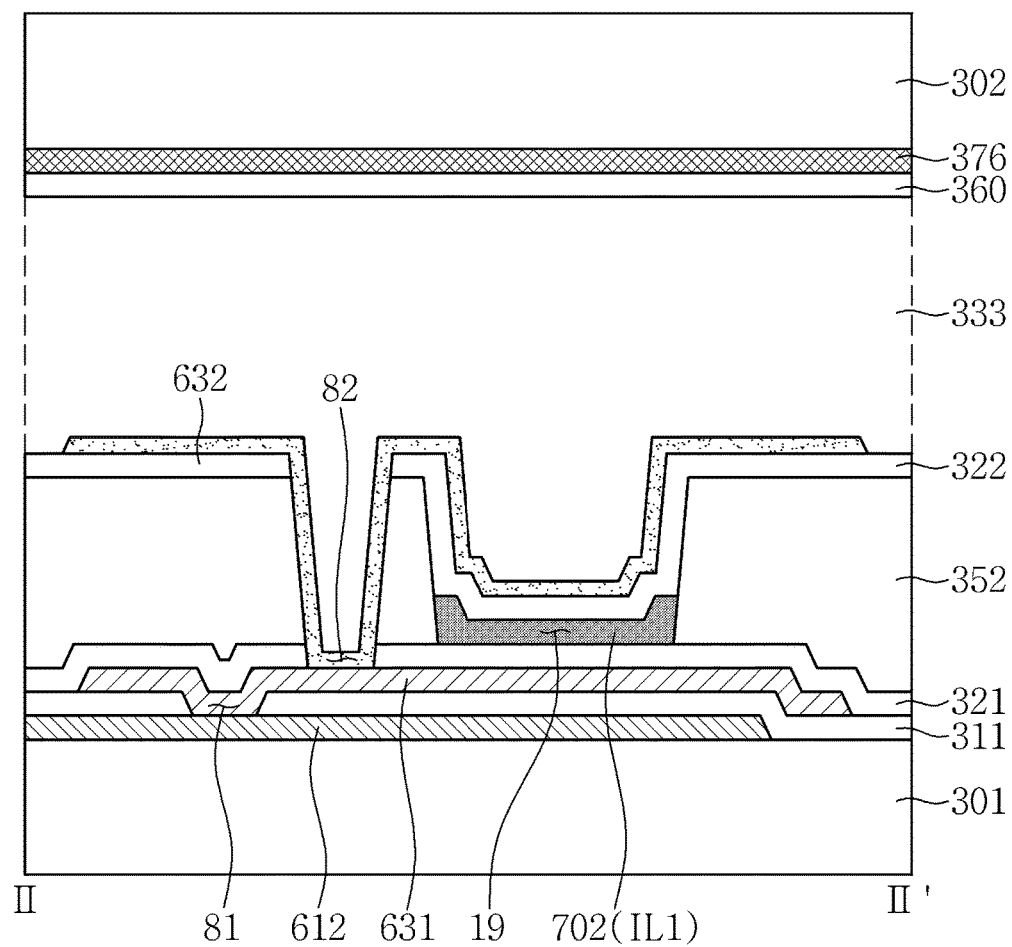
FIG. 19 is a cross-sectional view of a display device taken along sectional line II-II' of FIG. 15 according to some exemplary embodiments.

FIG. 19 is a cross-sectional view of a display device taken along sectional line II-II' of FIG. 15 according to some exemplary embodiments. The display device of FIG. 19 is similar to the display device of FIG. 18, and, as such, primarily differences are described below.

As illustrated in FIG. 19, an insulating interlayer 352 may have a hole 19 in an overlap area between a first input repair line IL1 and a second pad portion 612. The first input repair line IL1 is disposed in the hole 19 of the insulating interlayer 352. Accordingly, the first input repair line IL1 contacts a first protective layer 321. The first input repair line IL1 is disposed between the first protective layer 321 and a second protective layer 322. The first input repair line IL1 of FIG. 19 is disposed more adjacent to a first substrate 301 than the first input repair line IL1 of FIG. 18.

Figure 20:
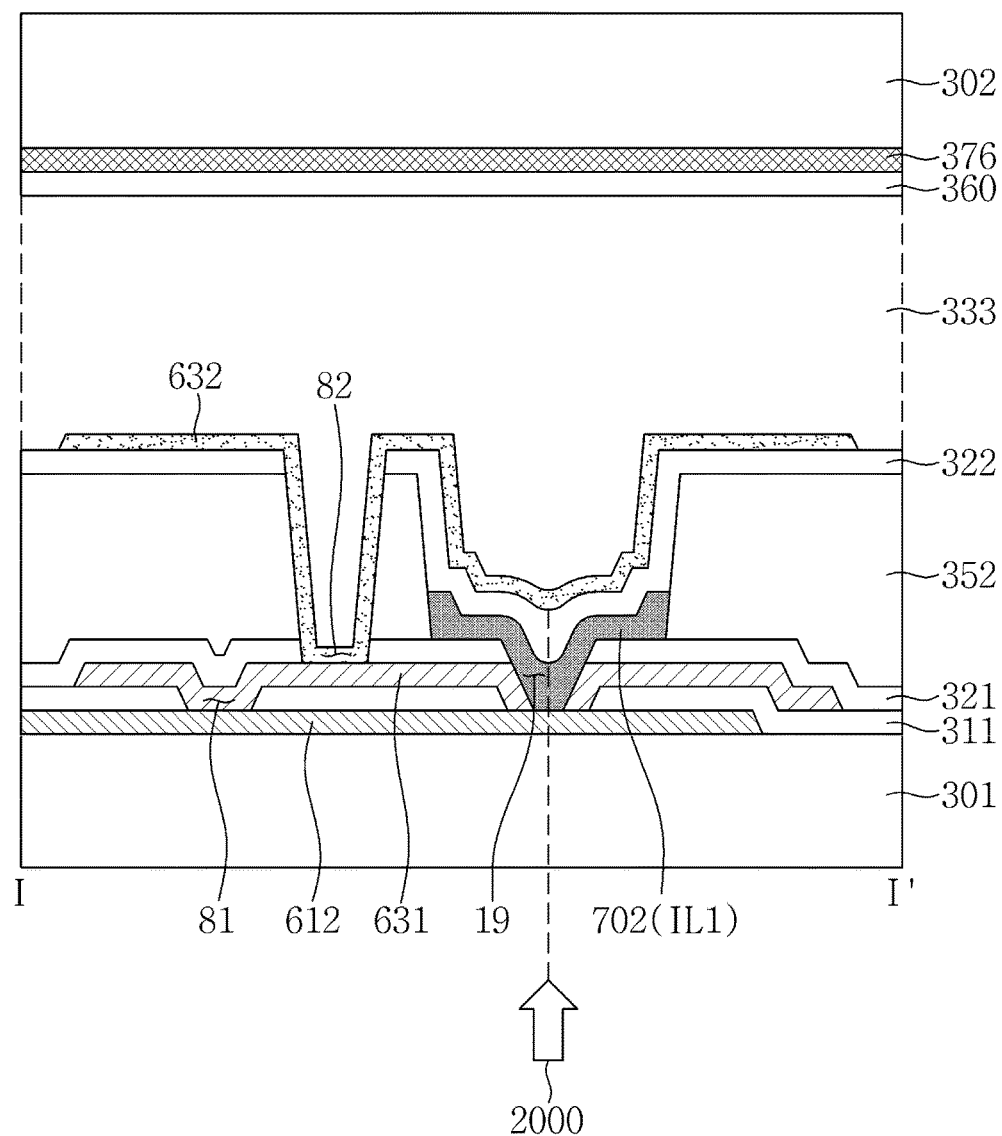
FIG. 20 is a view illustrating a repair process using a first input repair line according to a configuration of FIG. 19 according to some exemplary embodiments.

FIG. 20 is a view illustrating a repair process using a first input repair line according to a configuration of FIG. 19 according to some exemplary embodiments.

As illustrated in FIG. 20, a laser beam from a laser irradiation apparatus is irradiated from a lower portion of a first substrate 301 in a direction of arrow 2000. The laser beam passes through the first substrate 301 to be irradiated to a second pad portion 612 of a link line 444, a gate insulating layer 311, a first pad electrode 631, the first protective layer 321, and the first input repair line IL1. Accordingly, the gate insulating layer 311 and the first protective layer 321 are damaged in an overlap area among the second pad portion 612, the first pad electrode 631, and the first input repair line IL1. In addition, the second pad portion 612, the first pad electrode 631, and the first input repair line IL1 are melted in the overlap area to be in contact with one another. That is, the second pad portion 612, the first pad electrode 631, and the first input repair line IL1 are electrically connected to one another in the overlap area.

According to one or more exemplary embodiments, a display device may be configured to provide the following: first, since the resistance of a repair line can be reduced, an image data signal may be transmitted to a damaged data line with substantially no distortion; second, since an occupied area of the repair line can be reduced, the size of the substrate can be reduced.

Although certain exemplary embodiments and implementations have been described herein, other embodiments and modifications will be apparent from this description. For instance, various features of the above-described and other embodiments may be mixed and matched in any manner to produce further embodiments consistent with the inventive concepts. Accordingly, the inventive concepts are not limited to such embodiments, but rather to the broader scope of the presented claims and various obvious modifications and equivalent arrangements.

What is claimed is:

1. A display device comprising:
    a first substrate;
    a second substrate spaced apart from the first substrate;
    a gate line on the first substrate;
    a data line on the first substrate;
    a link line connected to one of the gate line and the data line;
    a driving integrated circuit connected to the link line;
    a repair line in a non-display area of the first substrate, the repair line overlapping, in the non-display area, the link line and the one of the gate line and the data line; and
    a dummy line overlapping the repair line, shapes of the dummy line and the repair line being substantially equivalent.

2. The display device of claim 1, wherein the repair line comprises:
    a first repair line overlapping the link line; and
    a second repair line overlapping the one of the gate line and the data line.

3. The display device of claim 2, wherein the dummy line comprises:
    a first dummy line overlapping the first repair line, shapes of the first dummy line and the first repair line being substantially equivalent; and
    a second dummy line overlapping the second repair line, shapes of the second dummy line and the second repair line being substantially equivalent.

4. The display device of claim 2, wherein the first repair line and the second repair line are disposed in different layers.

5. The display device of claim 2, wherein the first repair line and the one of the gate line and the data line are disposed in substantially a same layer.

6. The display device of claim 2, further comprising:
    an amplifier,
    wherein the amplifier comprises:
        an input terminal connected to the first repair line through a via line; and
        an output terminal connected to the second repair line through the via line.

7. The display device of claim 6, wherein the first repair line comprises:
    a line portion overlapping the link line;
    a first extension portion extending from the line portion toward an edge portion of the first substrate;
    a second extension portion extending from the first extension portion toward the driving integrated circuit; and
    a pad portion connecting the second extension portion and the input terminal of the amplifier.

8. The display device of claim 7, wherein:
    the line portion and the first extension portion are disposed in substantially a same layer;
    the second extension portion and the pad portion are disposed in substantially a same layer; and
    the line portion and the second extension portion are disposed in different layers.

9. The display device of claim 2, wherein a portion of the first repair line is disposed between a display area of the first substrate and the driving integrated circuit.

10. The display device of claim 1, wherein the repair line is disposed between the first substrate and the dummy line.

11. The display device of claim 1, further comprising:
    a first insulating layer between the repair line and the dummy line; and
    a second insulating layer between the first insulating layer and the dummy line.

12. The display device of claim 1, further comprising:
    a first insulating layer on the repair line; and
    a second insulating layer on the first insulating layer, the second insulating layer comprising a hole defined in correspondence with the dummy line.

13. The display device of claim 12, wherein the hole is defined in an overlap area among the repair line, the dummy line, and the one of the gate line and the data line.

14. The display device of claim 12, wherein the hole is defined in an overlap area among the link line, the repair line, and the dummy line.

15. The display device of claim 14, wherein the common line and the dummy line are disposed in substantially a same layer.

16. The display device of claim 15, wherein the common line and the dummy line comprise substantially a same material.

17. A display device comprising:
a first substrate;
a second substrate spaced apart from the first substrate;
a gate line on the first substrate;
a data line on the first substrate;
a link line connected to one of the gate line and the data line;
a driving integrated circuit connected to the link line; and
a repair line in a non-display area of the first substrate, the repair line overlapping the link line and the driving integrated circuit.

18. The display device of claim 17, wherein the repair line comprises:
a first repair line overlapping the link line; and
a second repair line overlapping the one of the gate line and the data line.

19. The display device of claim 1, further comprising:
a switching element in a display area of the first substrate, the switching element being connected to the gate line and the data line;
a first protective layer on the switching element;
an insulating interlayer on the first protective layer;
a common electrode on the insulating interlayer;
a common line on the common electrode;
a second protective layer on the common line and the common electrode; and
a pixel electrode connected to the switching element through a contact hole passing through the second protective layer, the insulating interlayer, and the first protective layer.

20. A display device comprising:
a substrate;
a signal line on the substrate;
a repair line in a non-display area of the substrate overlapping the signal line; and
a dummy metal line overlapping the repair line, the dummy metal line shaped along the repair line without electrical contact.

* * * * *